US009569149B2

(12) United States Patent
Sato

(10) Patent No.: US 9,569,149 B2
(45) Date of Patent: Feb. 14, 2017

(54) JOB PROCESSING SYSTEM, JOB PROCESSING APPARATUS, AND NON-TRANSITORY COMPUTER READABLE MEDIUM

(71) Applicant: FUJI XEROX CO., LTD., Tokyo (JP)

(72) Inventor: Chihiro Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/019,307

(22) Filed: Feb. 9, 2016

(65) Prior Publication Data
US 2017/0017443 A1 Jan. 19, 2017

(30) Foreign Application Priority Data

Jul. 17, 2015 (JP) ................................. 2015-143376

(51) Int. Cl.
G06F 3/12 (2006.01)
H04N 1/00 (2006.01)
(52) U.S. Cl.
CPC ............ *G06F 3/1215* (2013.01); *G06F 3/124* (2013.01); *G06F 3/1226* (2013.01); *G06F 3/1259* (2013.01); *G06F 3/1274* (2013.01); *G06F 3/1285* (2013.01); *G06F 3/1291* (2013.01); *H04N 1/00244* (2013.01); *H04N 2201/0094* (2013.01)
(58) Field of Classification Search
None
See application file for complete search history.

(56) References Cited

U.S. PATENT DOCUMENTS

| 7,973,962 | B2 * | 7/2011 | Tian | G06F 3/1212 |
| | | | | 358/1.15 |
| 8,542,384 | B2 * | 9/2013 | Ito | G06F 3/1211 |
| | | | | 358/1.13 |
| 8,836,987 | B2 * | 9/2014 | Gaertner | G06F 3/1213 |
| | | | | 358/1.1 |
| 2003/0002069 | A1 * | 1/2003 | Bhogal | G06F 3/1204 |
| | | | | 358/1.15 |
| 2008/0189716 | A1 * | 8/2008 | Nakahara | G06F 21/608 |
| | | | | 718/105 |

(Continued)

FOREIGN PATENT DOCUMENTS

JP 2000-231465 A 8/2000

Primary Examiner — Dung Tran
(74) Attorney, Agent, or Firm — Oliff PLC

(57) ABSTRACT

A job processing system includes first and second job processing apparatuses. The first job processing apparatus includes the followings. A first calculation unit calculates first estimated completion time expected if the job is processed by the first job processing apparatus. A first transmission unit transmits the job and the first estimated completion time. The second job processing apparatus includes the followings. A reception unit receives the job and the first estimated completion time. The second calculation unit calculates second estimated completion time expected if the job is processed by the second job processing apparatus. The discarding unit discards the job if the first estimated completion time is earlier than the second estimated completion time. The notification unit notifies the first job processing apparatus of start of processing if the first estimated completion time is later than the second estimated completion time. The processed job transmission unit transmits the processed job.

9 Claims, 13 Drawing Sheets

(56) References Cited

U.S. PATENT DOCUMENTS

2008/0295103 A1* 11/2008 Shimizu ................ G06F 9/5044
718/102
2010/0005167 A1* 1/2010 Kishimoto ......... H04N 1/00347
709/224

* cited by examiner

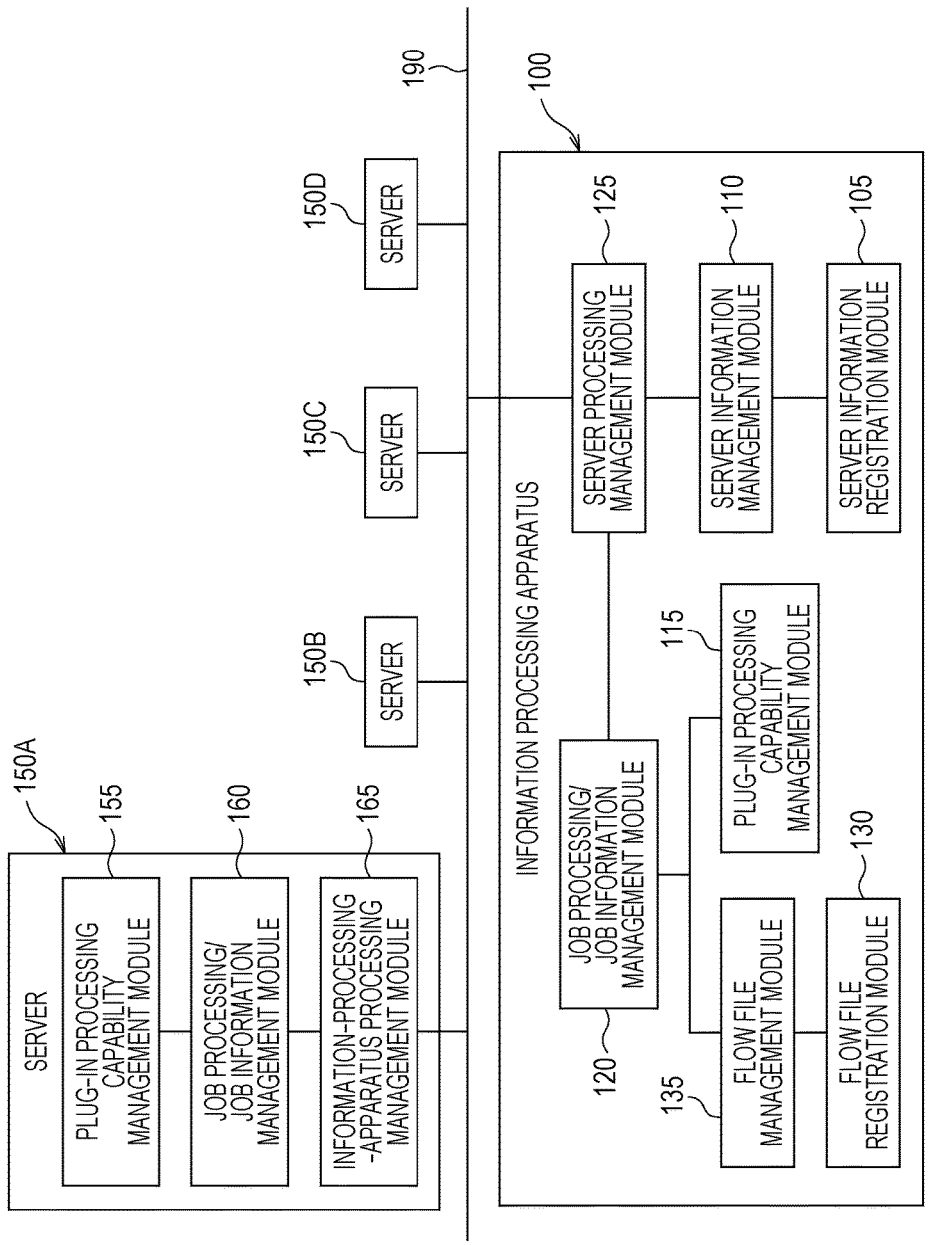

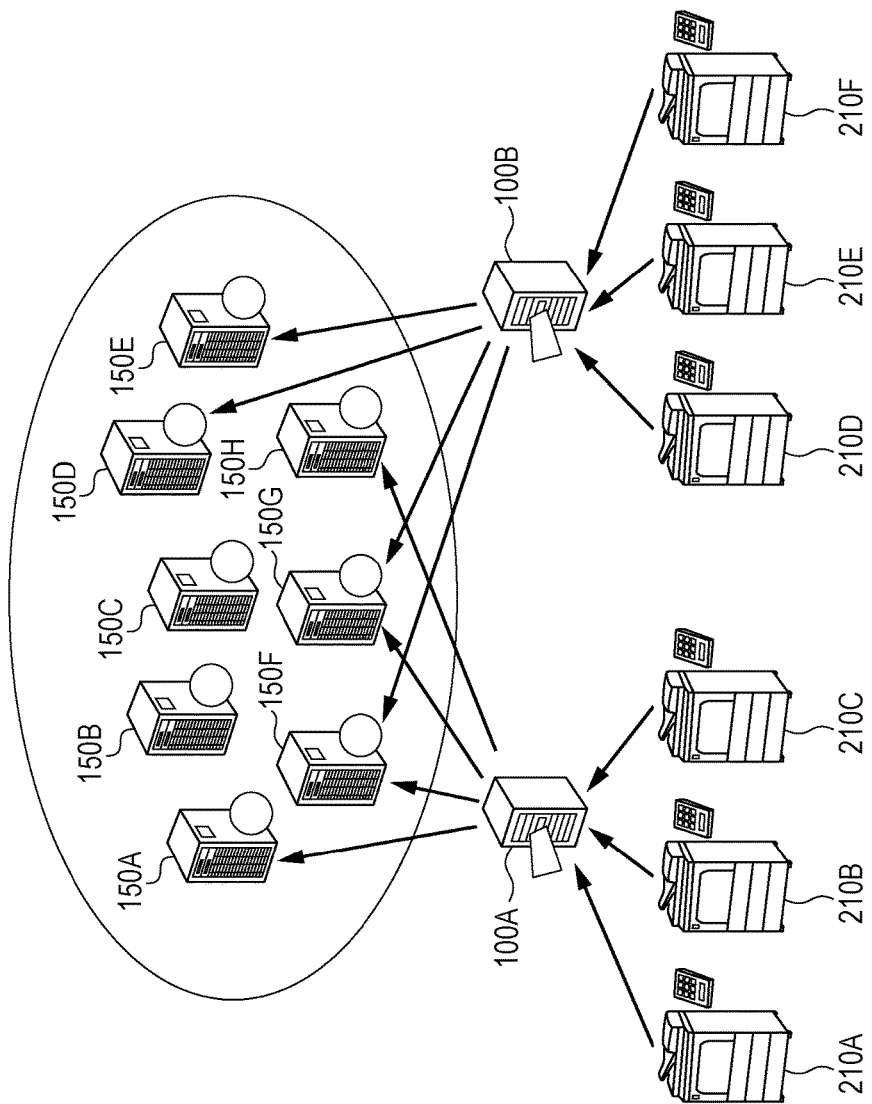

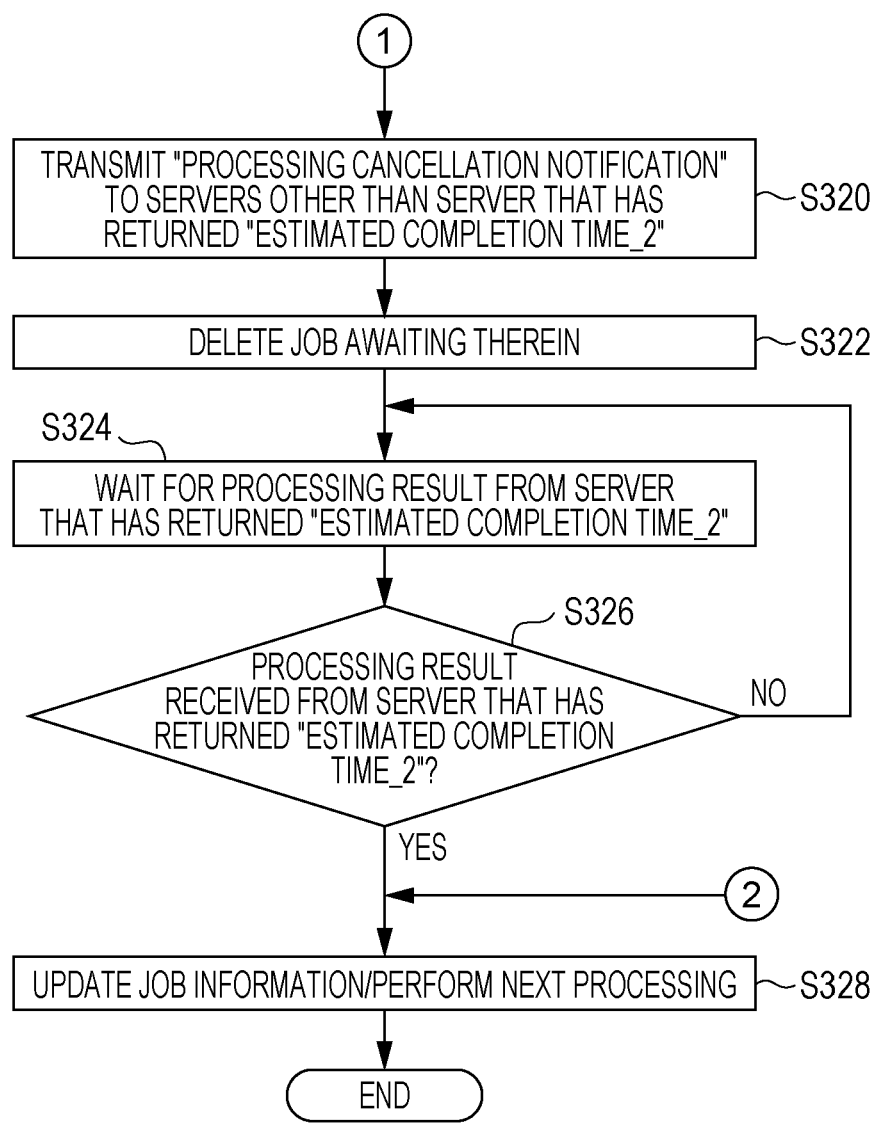

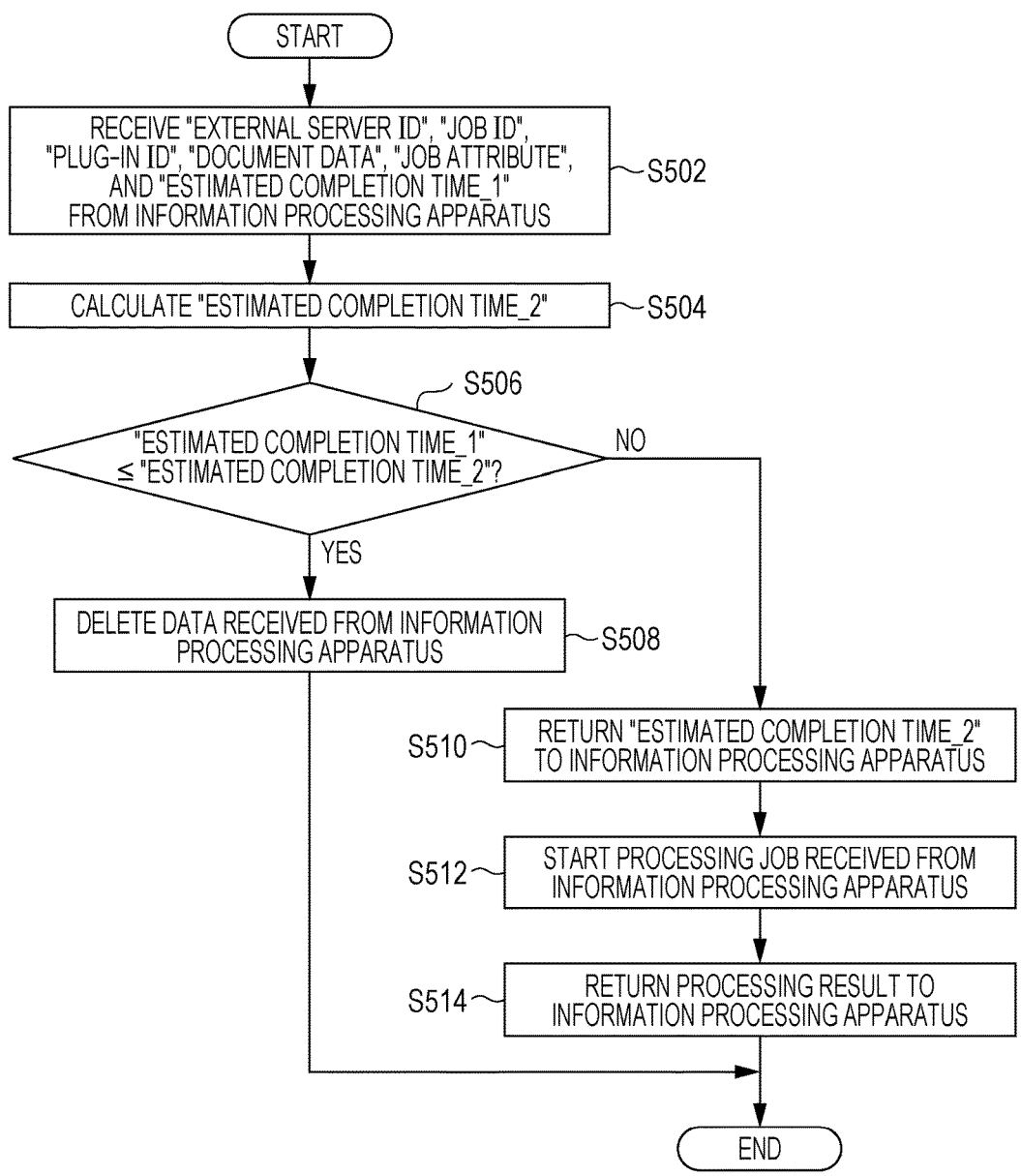

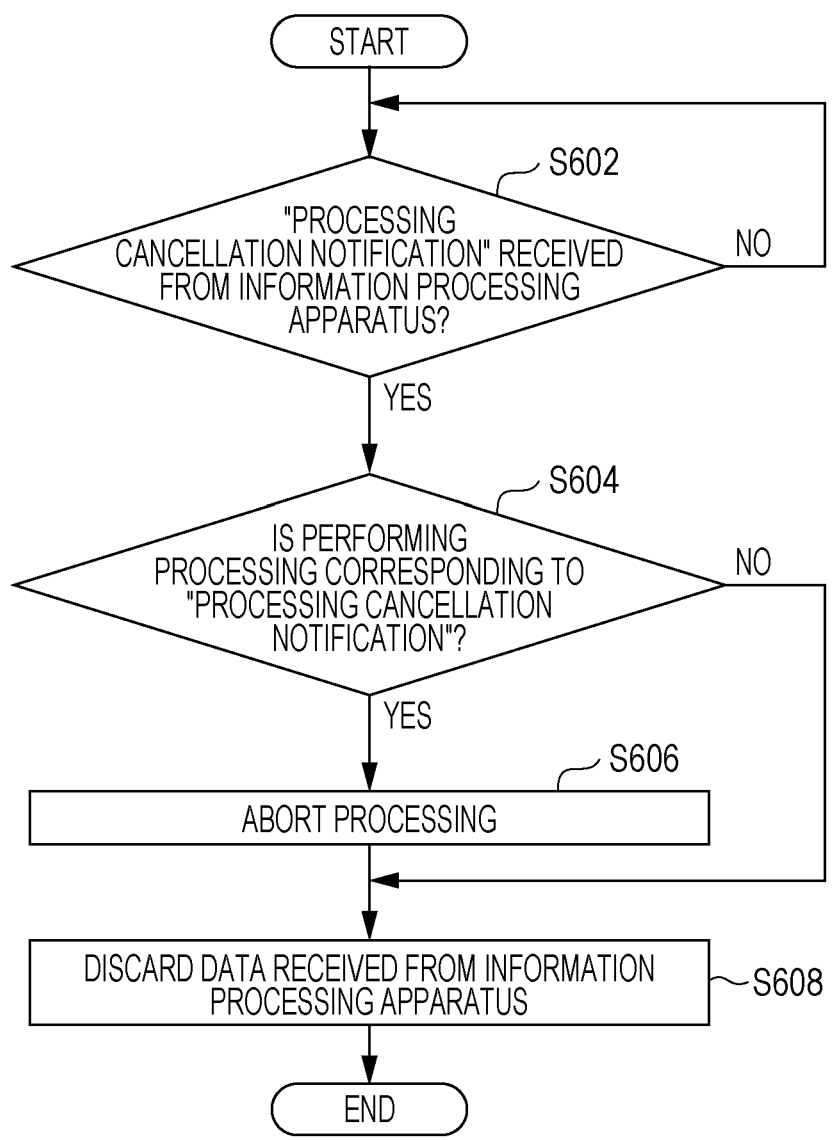

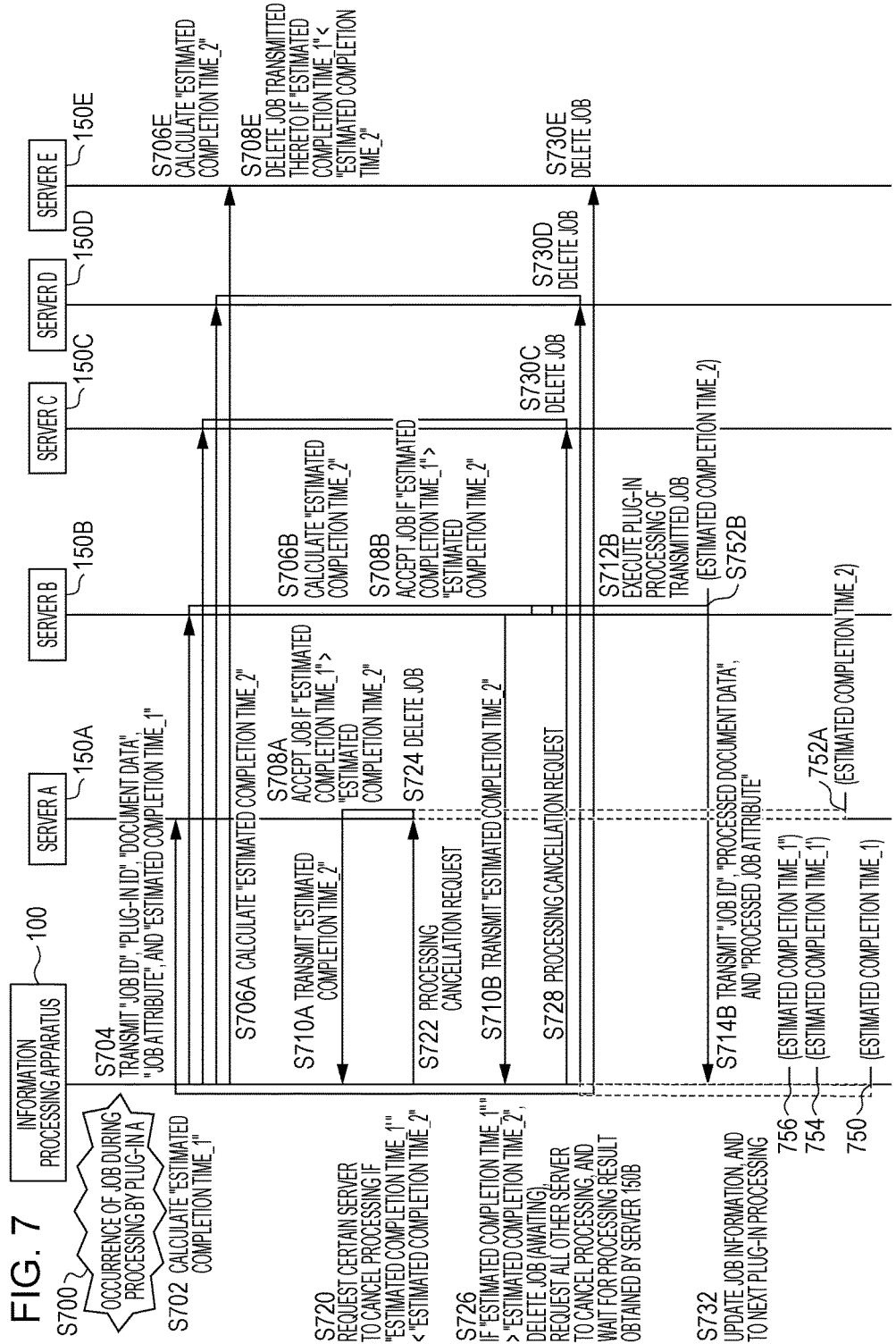

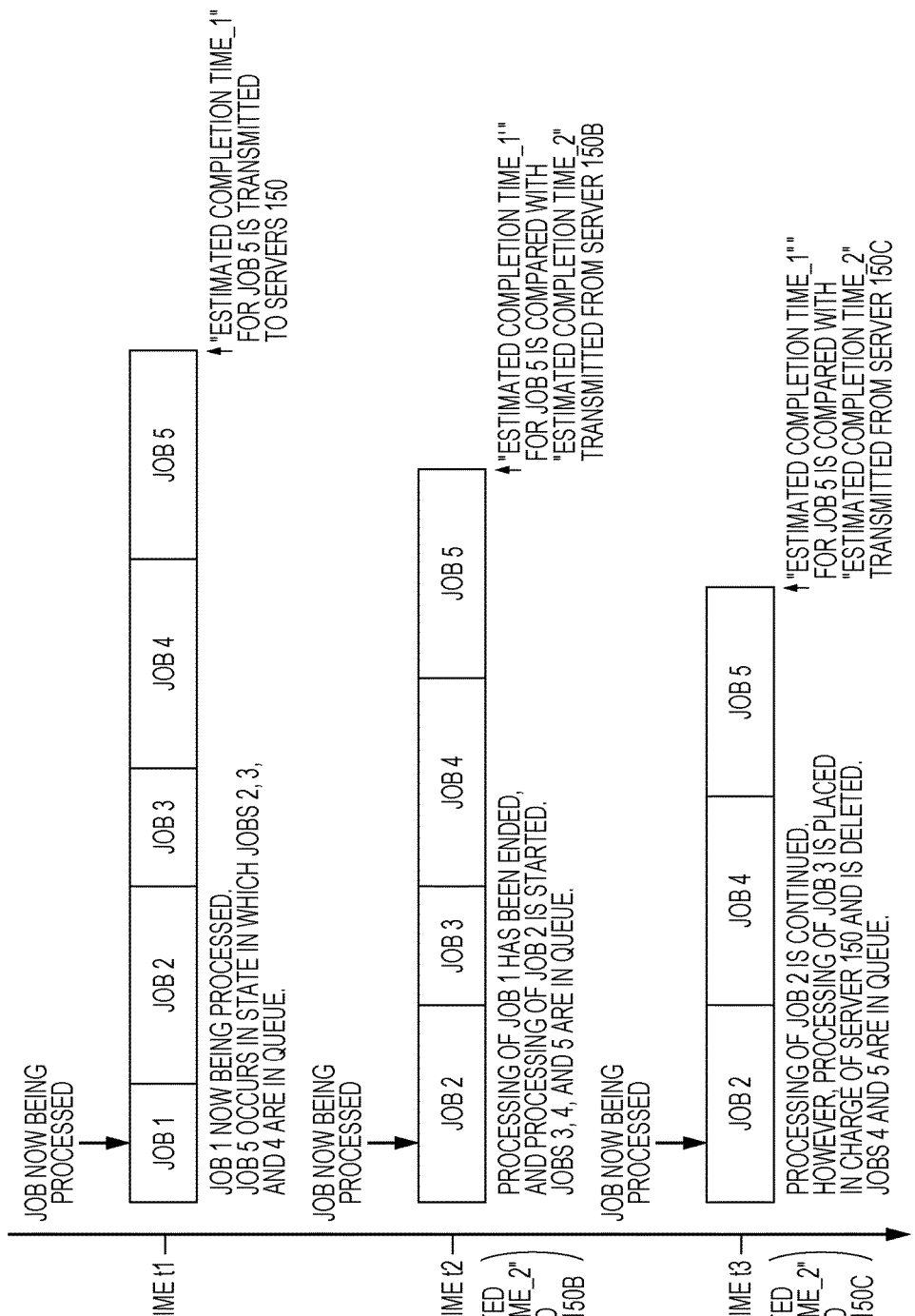

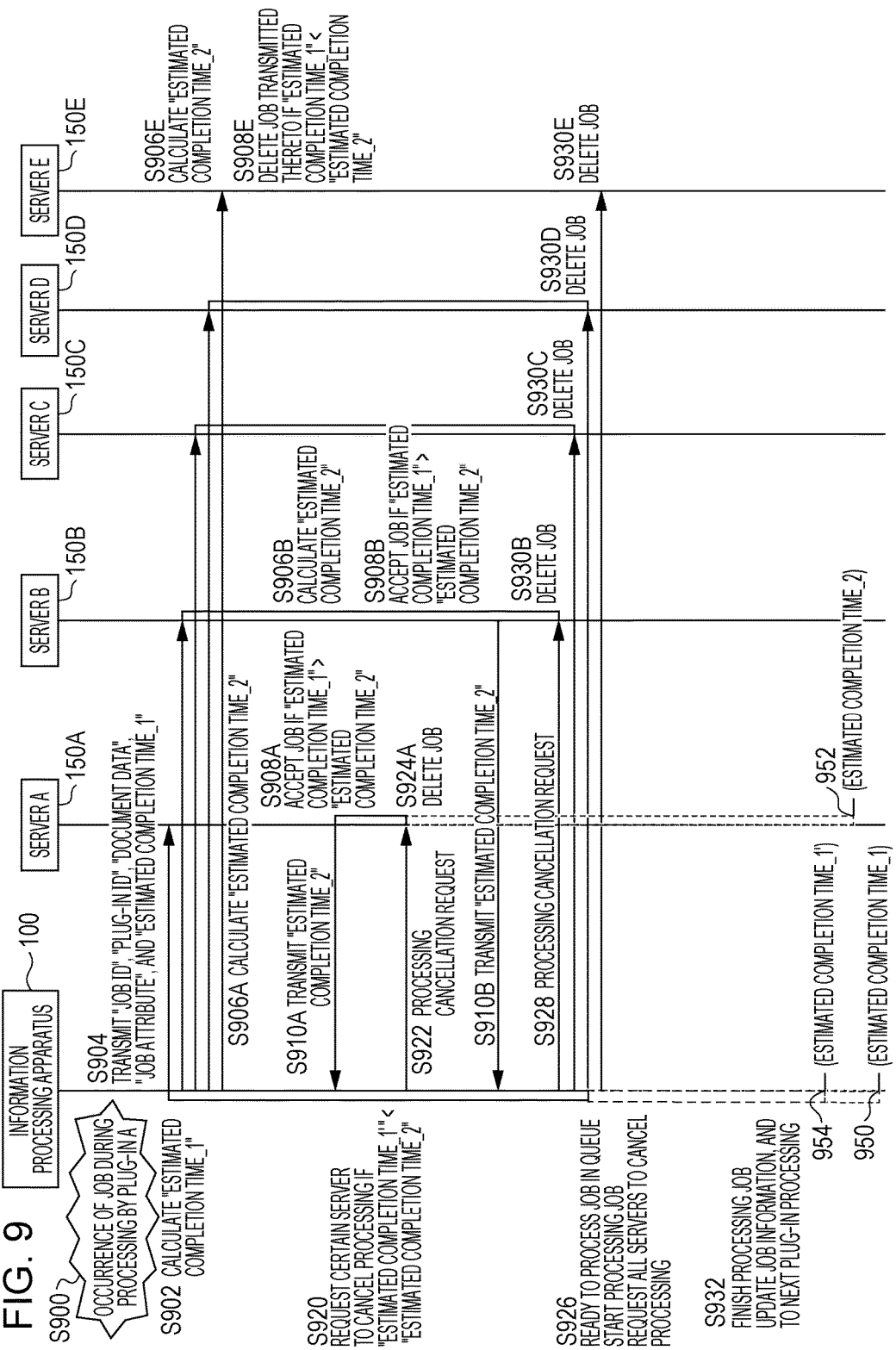

FIG. 10

| FLOW ID 1005 | PLUG-IN ID OF PLUG-IN FUNCTION PROCESSED FIRST 1010 | PLUG-IN ID OF PLUG-IN FUNCTION PROCESSED SECOND 1020 | PLUG-IN ID OF PLUG-IN FUNCTION PROCESSED THIRD 1030 | ... | PLUG-IN ID OF PLUG-IN FUNCTION PROCESSING IN N-TH TURN 10N0 |
|---|---|---|---|---|---|
| xxx-xx-xxx1 | 002 | 006 | 001 | ... | 009 |
| ... | ... | ... | ... | ... | ... |
| xxx-xx-xxxN | 007 | 004 | 006 | N/A | N/A |

| PLUG-IN ID 1105 | ESTIMATED PROCESSING COMPLETION TIME 1110 | PROCESSING TIME TAKEN BY MAIN SERVER PER UNIT DATA (SEC/KB) 1120 | PROCESSING TIME TAKEN BY EXTERNAL SERVER PER UNIT DATA (SEC/KB) 1130 |
|---|---|---|---|
| 001 | [(Jobid1, time1), (Jobid2, time2), (Jobid3, time3)] | 25.3 | 12.6 |
| ... | ... | ... | ... |
| 00n | [(Jobid99, time99), (Jobid100, time100)] | 34.5 | 22.1 |

| JOB ID | PROCESSED PLUG-IN ID | DOCUMENT DATA | DOCUMENT DATA SIZE | JOB ATTRIBUTE |
|---|---|---|---|---|
| aa-aa-aaa1 | 003 | Fadgabfagdg | 259 | (a = xxx, b = 1, ···, k = NNN) |
| ... | ... | ... | ... | ... |
| nn-nn-nnnN | 005 | Hrgjserghna | 10032 | (time = 13:24, box = 3) |

| PLUG-IN ID | ESTIMATED PROCESSING COMPLETION TIME | PROCESSING TIME PER UNIT DATA (SEC/KB) |
|---|---|---|
| 001 | [(Jobid05, time05), (Jobid1, time01)] | 5.3 |
| ... | ... | ... |
| 00n | [(Jobid9, time9), (Jobid10, time10)] | 104.5 |

1305  1310  1320  1300

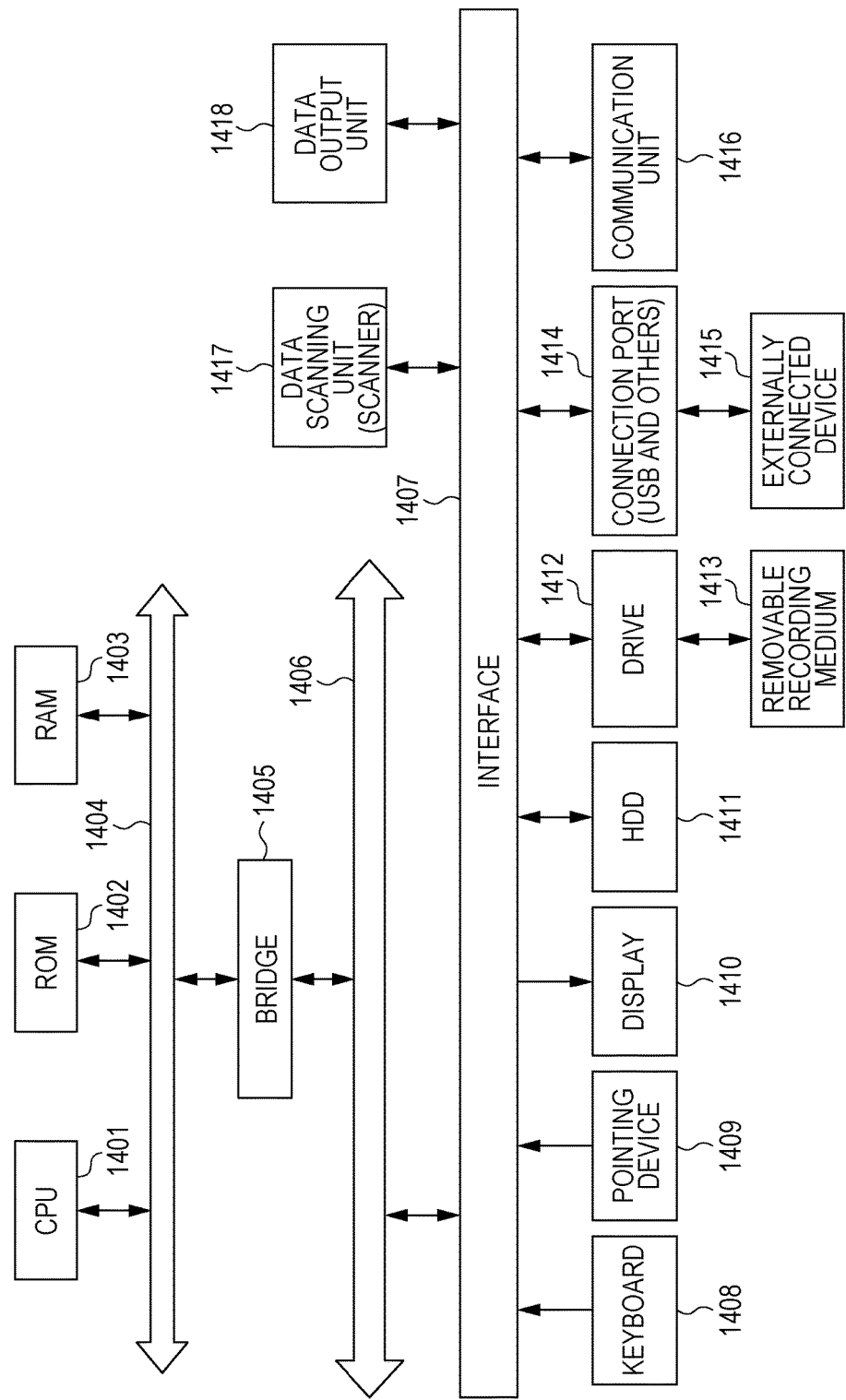

JOB PROCESSING SYSTEM, JOB PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-143376 filed Jul. 17, 2015.

BACKGROUND (i) Technical Field

The present invention relates to a job processing system, a job processing apparatus, and a non-transitory computer readable medium.

(ii) Related Art

In the case where a job occurs in any one of plural job processing apparatuses, a job processing apparatus having the highest processing speed is selected from the plural job processing apparatuses to process the job.

SUMMARY

According to an aspect of the invention, there is provided a job processing system including a first job processing apparatus and a second job processing apparatus connected to the first job processing apparatus via a communication line. The first job processing apparatus includes a first calculation unit and a first transmission unit. The first calculation unit calculates, in a case where a job to be processed occurs in the first job processing apparatus, first estimated completion time for a case where the job is processed by the first job processing apparatus. The first transmission unit transmits at least the job and the first estimated completion time to the second job processing apparatus. The second job processing apparatus includes a reception unit, a second calculation unit, a discarding unit, a notification unit, and a processed job transmission unit. The reception unit receives the job and the first estimated completion time from the first job processing apparatus. The second calculation unit calculates second estimated completion time for a case where the received job is processed by the second job processing apparatus. The discarding unit discards the received job in a case where the first estimated completion time is earlier than the second estimated completion time. The notification unit starts processing the received job in a case where the first estimated completion time is later than the second estimated completion time and notifies the first job processing apparatus that processing of the received job has been started. The processed job transmission unit transmits the processed job to the first job processing apparatus in response to completion of the processing of the received job.

BRIEF DESCRIPTION OF THE DRAWINGS

An exemplary embodiment of the present invention will be described in detail based on the following figures, wherein:

FIG. 1 illustrates an example of a conceptual module configuration according to an exemplary embodiment;

FIGS. 2A and 2B each illustrate an example of a configuration of a system to which the exemplary embodiment is applied;

FIG. 4 is a flowchart illustrating the example of the process according to the exemplary embodiment;

FIG. 5 is a flowchart illustrating an example of a process according to the exemplary embodiment;

FIG. 6 is a flowchart illustrating an example of a process according to the exemplary embodiment;

FIG. 7 is a sequence chart illustrating an example of a process according to the exemplary embodiment;

FIGS. 8A to 8C describe an example of a process according to the exemplary embodiment;

FIG. 9 is a sequence chart illustrating an example of a process according to the exemplary embodiment;

FIG. 10 illustrates an example of a data structure of a plug-in identification (ID) list;

FIG. 11 illustrates an example of a data structure of a plug-in processing capability management table;

FIG. 12 illustrates an example of a data structure of a job management table;

FIG. 13 illustrates an example of a data structure of a plug-in processing capability management table; and FIG. 14 is a block diagram illustrating an example of a hardware configuration of a computer that implements the exemplary embodiment.

DETAILED DESCRIPTION

Figure 2B:
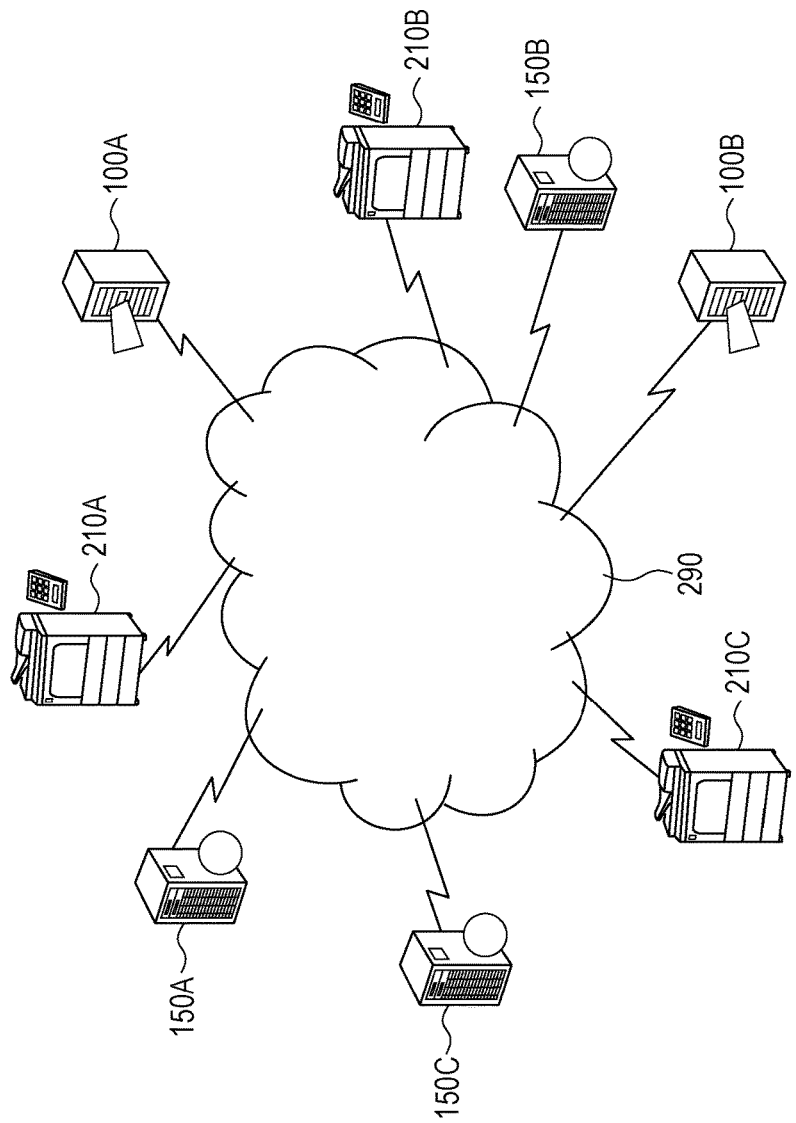

An exemplary embodiment suitable for implementing the present invention will be described below with reference to the accompanying drawings.

FIG. 1 illustrates an example of a conceptual module configuration according to an exemplary embodiment.

In general, the term "module" refers to a logically separable component, such as a software component (a computer program) or a hardware component. Thus, the term "module" used in this exemplary embodiment indicates not only a module in a computer program but also a module in a hardware configuration. For this reason, the exemplary embodiment includes descriptions regarding a computer program causing a computer to function as the modules (such as a program causing a computer to execute each procedure, a program causing a computer to function as each unit, or a program causing a computer to implement each function), a system, and a method. For ease of explanation, the expressions "to store" and "to cause a device to store" and expressions equivalent thereto are used. When the exemplary embodiment is implemented as a computer program, these expressions indicate that the computer program causes a storage device to store information or the computer program performs control to cause a storage device to store information. Also, modules and functions may have one-to-one correspondences; however in implementations, one module may be constituted by one program, plural modules may be constituted by one program, or conversely one module may be constituted by plural programs. In addition, plural modules may be executed by one computer or one module may be executed by plural computers in a distributed or parallel environment. Moreover, one module may include another module. Hereinafter, the term "connection" is used to refer to physical connection and logical connection (such as data exchange or reference relations between instructions and between pieces of data). Further, the term "predetermined" indicates a state where something is determined prior to target processing. The term "predetermined" includes the meaning that something is determined in accordance with a state/status at that time or a state/status up to that point before and even after processing according to the exemplary embodiment starts as long as the determination is made prior to the target processing. In the case where plural "predetermined values" are used, the plural "predetermined values" may be different from each other or two or more values (which obviously include all values) may be the same. Moreover, the expression "if something is A, B is performed" is used to indicate that "it is determined whether or not something is A, and then B is performed if it is determined that something is A", except for the case where determination regarding whether or not something is A is not needed.

In addition, a system or an apparatus may be constituted by plural computers, plural hardware components, plural devices, or the like that are connected to each other via communication networks, such as networks (including one-to-one communication connections), or may be constituted by one computer, one hardware component, one device, or the like. The terms "apparatus" and "system" are used as synonyms to each other. Obviously, the "system" does not include a social "mechanism" (social system) that is an arrangement made by humans.

In each process performed by each module or in each of plural processes performed by a module, information is read from a storage device, the process is performed on the information, and the resulting information obtained from the process is written to the storage device. Thus, a description regarding reading information from the storage device performed prior to the process and writing information to the storage device subsequent to the process is occasionally omitted. Here, examples of the storage device may include a hard disk drive (HDD), a random access memory (RAM), an external storage medium, a storage device connected via a communication network, and registers included in a central processing unit (CPU).

As illustrated in the example in FIG. 1, a job processing system according to an exemplary embodiment includes an information processing apparatus 100 and servers 150 (specifically, 150A, 150B, 150C, and 150D) that are connected to one another via a communication line 190. The plural servers 150 may be provided for the single information processing apparatus 100. The servers 150B, 150C, and 150D illustrated in the example in FIG. 1 each have substantially the same configuration as that of the server 150A. Note that the servers 150A, 150B, 150C, and 150D are sometimes collectively referred to as the servers 150 in the following description.

In the job processing system, a process flow is defined in advance by combining plural provided plug-in functions, and a job for an input document is processed in accordance with the process flow. In such a job processing system, the number of processes capable of concurrently processing respective plug-in functions is limited for a server. Accordingly, if many documents are simultaneously input, a job waiting to be processed may occur during execution of the plug-ins, which may decrease the overall performance.

To address such a situation, a method for improving the overall performance has been conceived. An outside server (hereinafter, also referred to as an external server) is requested to process a waiting job that has occurred for each plug-in function (for example, image conversion processing or character recognition processing) so as to increase the number of jobs to be concurrently processed by this server (hereinafter, also referred to as a main server) and the external server.

In order to increase the number of jobs to be concurrently processed, by causing the main server and the external server to operate in cooperation with each other, it is desirable to instantaneously find an external server that returns the processing result quicker than the main server and request the external server to process a waiting job that has occurred in each plug-in process in the main server.

Examples of techniques for finding an external server include a technique disclosed in Japanese Unexamined Patent Application Publication No. 2000-231465.

However, with the technique disclosed in Japanese Unexamined Patent Application Publication No. 2000-231465, a request is made after the status of an external server is determined. Thus, the status of the external server may change at a time point at which the job has actually received, and consequently the processing result may be returned later than expected. Although a technique of reserving resources of the external server on request before processing is also available as a method for avoiding the aforementioned situation, such a technique requires a complicated scheduling process.

The exemplary embodiment addresses processing statuses of servers (including the main server and the external server) that instantaneously change.

Note that a flow file is a file that defines how to-be-processed data input to the job processing system is to be processed. The definition is made by a combination of plural plug-in functions. Examples of the to-be-processed data include documents. The following description will be given by using a document as the to-be-processed data.

A job is a unit of execution in which the input document is processed in accordance with the flow file. A job includes a "job ID" that uniquely defines the job, "document data" that is a processing result of the input document obtained using each plug-in function, "document data size" of the document data, and a "job attribute" generated by a process of each plug-in function. Note that the "job ID" is defined to be unique. For example, Globally Unique Identifier (GUID) or the like may be used.

The information processing apparatus 100 according to the exemplary embodiment corresponds to the aforementioned main server, and the servers 150 correspond to the aforementioned external servers. The information processing apparatus 100 is capable of performing processing which each of the servers 150 is requested to perform.

The information processing apparatus 100 includes a server information registration module 105, a server information management module 110, a plug-in processing capability management module 115, a job processing/job information management module 120, a server processing management module 125, a flow file registration module 130, and a flow file management module 135.

The servers 150 each include a plug-in processing capability management module 155, a job processing/job information management module 160, and an information-processing-apparatus processing management module 165.

The information processing apparatus 100 manages an input document as processing-target data of a job, calls plug-in functions defined in a flow file registered in advance in a certain order, and processes the job.

The server information registration module 105 is connected to the server information management module 110. The server information registration module 105 registers information concerning each of the servers 150. The information concerning each of the servers 150 may be input by a user operation or may be transmitted from the server 150.

The server information management module 110 is connected to the server information registration module 105 and the server processing management module 125. The server information management module 110 manages ID information (for example, a service Uniform Resource Locator (URL) with which the server 150 is uniquely identified and a service provided by the server 150 is accessed).

The server processing management module 125 is connected to the server information management module 110 and the job processing/job information management module 120. The server processing management module 125 is also connected to the information-processing-apparatus processing management module 165 of the server 150A and to the server 150B, the server 150C, and the server 150D. The server processing management module 125 manages communications between the information processing apparatus 100 and each of the servers 150. The server processing management module 125 transmits at least a job to be processed and estimated completion time to the servers 150 (the servers 150A, 150B, 150C, and 150C).

The plug-in processing capability management module 115 is connected to the job processing/job information management module 120 and the flow file management module 135. The plug-in processing capability management module 115 manages, for each plug-in function, the following pieces of information (1) to (3).
(1) Plug-in ID
(2) Estimated Processing Completion Time Specifically, a job being processed, a job for which processing reservation is made (waiting job), and estimated completion times at which processing of the respective jobs are to complete are managed in the information processing apparatus 100. For example, the managed information includes combinations of a job ID and estimated completion time for a job indicated by the job ID. Specifically, data denoted as [(jobid1, time1), (jobid2, time2), . . . , (jobidN, timeN)] is managed.
(3) Unit Data Processing Time The job processing/job information management module 120 is connected to the plug-in processing capability management module 115, the server processing management module 125, and the flow file management module 135. The job processing/job information management module 120 issues a "job ID" to process an input document, generates a job, and manages the job. The job processing/job information management module 120 processes the generated job by sequentially calling the plug-in functions in accordance with the "plug-in IDs" defined in the flow file.

In the case where a job to be processed occurs in the information processing apparatus 100, the job processing/job information management module 120 calculates estimated completion time that is expected if the job were processed by the information processing apparatus 100.

The flow file registration module 130 is connected to the flow file management module 135. The flow file registration module 130 creates and registers a flow file used to process a document input to the information processing apparatus 100. A flow file is defined by plural specified plug-ins.

The flow file management module 135 is connected to the job processing/job information management module 120 and the flow file registration module 130. The flow file management module 135 manages a flow file registered by the flow file registration module 130.

Each of the servers 150 is capable of performing a process of a specific plug-in function included in the flow file.

The information-processing-apparatus processing management module 165 is connected to the job processing/job information management module 160. The information-processing-apparatus processing management module 165 is also connected to the server processing management module 125 of the information processing apparatus 100 and to the server 150B, the server 150C, and the server 150D. The information-processing-apparatus processing management module 165 manages communications with the information processing apparatus 100. The information-processing-apparatus processing management module 165 receives, from the information processing apparatus 100, at least a job and the estimated completion time calculated by the information processing apparatus 100.

The plug-in processing capability management module 155 is connected to the job processing/job information management module 160. The plug-in processing capability management module 155 manages, for each plug-in function, the following pieces of information (1) to (3).
(1) Plug-in ID
(2) Estimated Processing Completion Time Specifically, a job currently processed by the server 150, a job for which processing reservation is made, and estimated completion times at which processing of the respective jobs are to complete are managed. For example, the managed information includes combinations of a job ID and estimated completion time for a job indicated by the job ID. Specifically, data denoted as [(jobid1, time1), (jobid2, time2), . . . , (jobidN, timeN)] is managed.
(3) Unit Data Processing Time The job processing/job information management module 160 is connected to the plug-in processing capability management module 155 and the information-processing-apparatus processing management module 165. The job processing/job information management module 160 determines whether processing completes earlier when the job received by the information-processing-apparatus processing management module 165 is processed by the plug-in function of the server 150.

The job processing/job information management module 160 calculates estimated completion time that is expected if the job received by the information-processing-apparatus processing management module 165 were processed by the server 150.

If the estimated completion time obtained by the information processing apparatus 100 is earlier than the estimated completion time obtained by the server 150, the job processing/job information management module 160 discards the job.

In addition, if the estimated completion time obtained by the information processing apparatus 100 is later than the estimated completion time obtained by the server 150, the job processing/job information management module 160 starts processing the job and notifies the information processing apparatus 100 that it has started processing the job.

Upon completing processing the job, the job processing/job information management module 160 transmits the processed job to the information processing apparatus 100.

In the case of starting processing the job, the job processing/job information management module 160 may also notify the information processing apparatus 100 of the estimated completion time.

In this case, the job processing/job information management module 120 of the information processing apparatus 100 recalculates the estimated completion time that is expected if the job were processed by the information processing apparatus 100 and compares the recalculated estimated completion time with the estimated completion time received from the server 150.

If the estimated completion time recalculated by the information processing apparatus 100 is earlier than the estimated completion time received from the server 150, the job processing/job information management module 120 of the information processing apparatus 100 transmits a request to cancel the processing to the server 150. In response to this request to cancel the processing, the job processing/job information management module 160 of the server 150 aborts the processing that has been started.

FIGS. 2A and 2B each illustrate an example of a configuration of a system to which the exemplary embodiment is applied.

An example of a system is illustrated which includes image processing apparatuses 210 that accept data to be processed in accordance with a flow, the plural servers 150 that process jobs of the flow, and the information processing apparatuses 100 that distribute the jobs to the servers 150 and process jobs of the flow.

In an example illustrated in FIG. 2A, an information processing apparatus 100A is connected to image processing apparatuses 210A, 210B, and 210C and the servers 150A, 150F, 150G, and 150H. An information processing apparatus 100B is connected to image processing apparatuses 210D, 210E, and 210F and servers 150D, 150E, 150F, and 150G. The image processing apparatus 210 scans a document in response to a user operation, a flow is selected, and an instruction is given from the image processing apparatus 210 to the information processing apparatus 100. The information processing apparatus 100 divides the flow into processes and distributes the processes to the plural servers 150 and the information processing apparatus 100. The processes are performed by the servers 150 and the information processing apparatus 100 to which the processes are distributed. Specifically, the image processing apparatus 210 is, for example, a scanner, a fax, or a multifunction peripheral (image processing apparatus having two or more functions of the scanner, the printer, the copier, and the fax). In addition, the image processing apparatus 210 may be a device such as a mobile terminal (for example, a mobile phone or a smartphone) having a camera function.

In an example illustrated in FIG. 2B, the information processing apparatuses 100A and 100B; the servers 150A, 150B, and 150C; and the image processing apparatuses 210A, 210B, and 210C are connected to one another via a communication network 290. The communication network 290 may be a wireless or wired network or a wireless and wired network. For example, the communication network 290 may be communication infrastructure, such as Internet or an intranet. In addition, functions of the information processing apparatuses 100 and the servers 150 may be implemented as cloud services.

Figure 3:
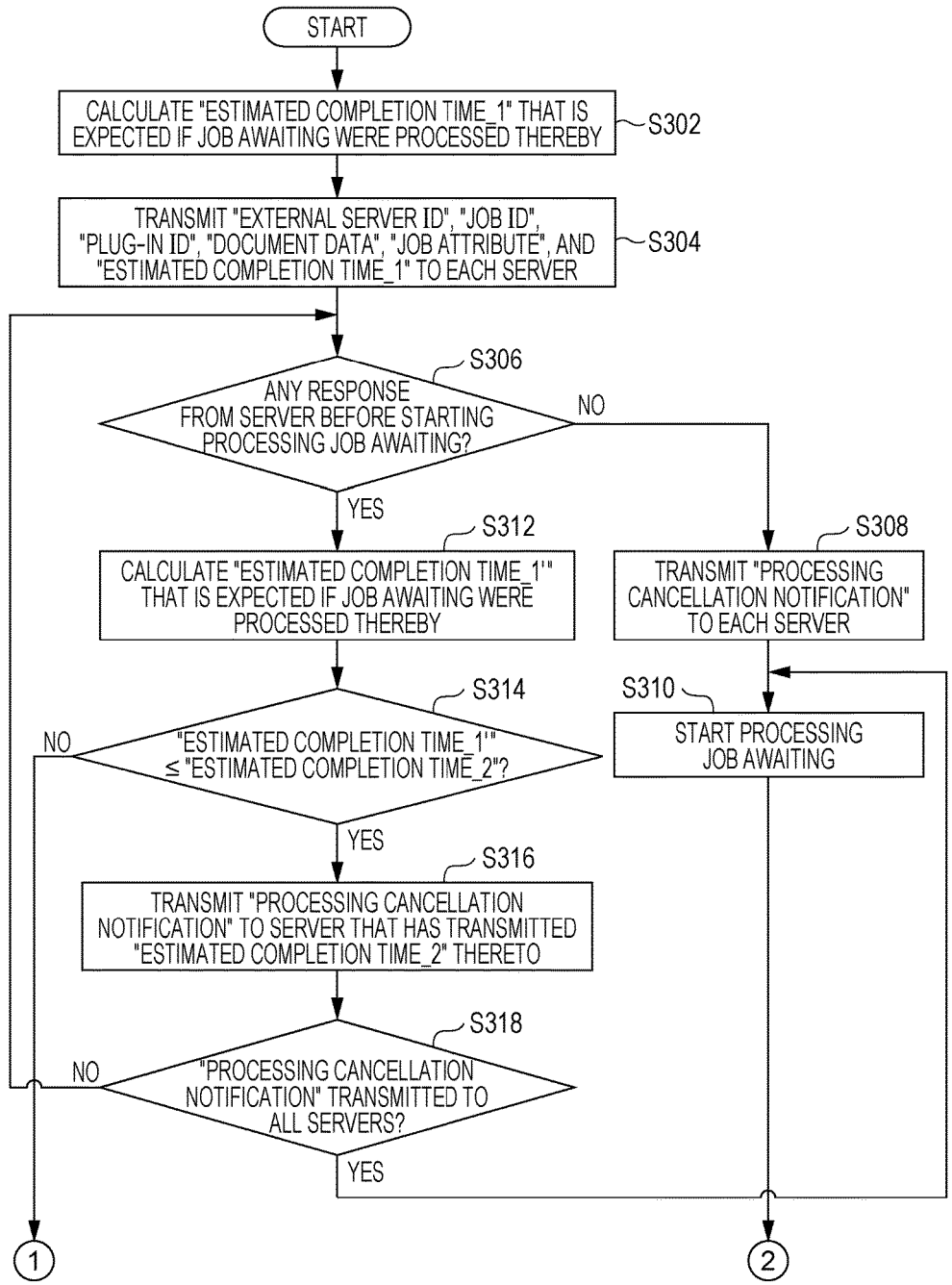
FIG. 3 is a flowchart illustrating an example of a process according to the exemplary embodiment.

FIGS. 3 and 4 are flowcharts illustrating an example of a process (performed by the information processing apparatus 100) according to the exemplary embodiment. The following process is performed in response to occurrence of a waiting job in the information processing apparatus 100.

In step S302, the information processing apparatus 100 calculates "estimated completion time_1" that is expected in the case where the information processing apparatus 100 processes the waiting job.

In step S304, the information processing apparatus 100 transmits an "external server ID", a "job ID", a "plug-in ID", "document data", a "job attribute", and the "estimated completion time_1" to each of the servers 150.

In step S306, the information processing apparatus 100 determines whether a response (estimated completion time_2) is returned from each of the servers 150 before the information processing apparatus 100 starts processing the waiting job. If a response is returned, the process proceeds to step S312; otherwise, the process proceeds to step S308.

In step S308, the information processing apparatus 100 transmits a "processing cancellation notification" to each of the servers 150.

In step S310, the information processing apparatus 100 starts processing the waiting job.

In step S312, the information processing apparatus 100 calculates "estimated completion time_1'" that is expected in the case where the information processing apparatus 100 processes the waiting job.

In step S314, the information processing apparatus 100 determines whether the "estimated completion time_1'" is less than or equal to the "estimated completion time_2" (estimated completion time_1'≤estimated completion time_2). If the "estimated completion time_1'" is less than or equal to the "estimated completion time_2" (estimated completion time_1' estimated completion time_2), the process proceeds to step S316; otherwise, the process proceeds to step S320.

In step S316, the information processing apparatus 100 transmits a "processing cancellation notification" to the server 150 that has returned the "estimated completion time_2".

In step S318, the information processing apparatus 100 determines whether it has transmitted the "processing cancellation notification" to all the servers 150. If the "processing cancellation notification" has been transmitted to all the servers 150, the process returns to step S310; otherwise, the process proceeds to step S306.

Referring now to FIG. 4, in step S320, the information processing apparatus 100 transmits the "processing cancellation notification" to the servers 150 other than the server 150 that has returned the "estimated completion time_2".

In step S322, the information processing apparatus 100 deletes the waiting job therefrom.

In step S324, the information processing apparatus 100 waits for a processing result from the server 150 that has returned the "estimated completion time_2".

In step S326, the information processing apparatus 100 determines whether the processing result is received from the server 150 that has returned the "estimated completion time_2". If the processing result is received, the process proceeds to step S328; otherwise, the process returns to step S324.

In step S328, the information processing apparatus 100 updates job information and performs the next processing.

Either processing of step S308 or processing of step S310 may be performed first or they may be performed in parallel. Likewise, either processing of step S320 or processing of step S322 may be performed first or they may be performed in parallel.

FIG. 5 is a flowchart illustrating an example of a process (performed by the server 150) according to the exemplary embodiment.

In step S502, the server 150 receives the "external server ID", the "job ID", the "plug-in ID", the "document data", the "job attribute", and the "estimated completion time_1" from the information processing apparatus 100.

In step S504, the server 150 calculates the "estimated completion time_2".

In step S506, the server 150 determines whether the "estimated completion time_1" is less than or equal to the "estimated completion time_2" (estimated completion time_1≤estimated completion time_2). If the "estimated completion time_1" is less than or equal to the "estimated completion time_2" (estimated completion time_1≤estimated completion time_2), the process proceeds to step S508; otherwise, the process proceeds to step S510.

In step S508, the server 150 deletes the data received from the information processing apparatus 100.

In step S510, the server 150 returns the "estimated completion time_2" to the information processing apparatus 100.

In step S512, the server 150 starts processing the job received from the information processing apparatus 100.

In step S514, the server 150 returns the processing result to the information processing apparatus 100.

Note that either processing of step S510 or processing of step S512 may be performed first or they may be performed in parallel.

FIG. 6 is a flowchart illustrating an example of a process (performed by the server 150) according to the exemplary embodiment.

In step S602, the server 150 determines whether the "processing cancellation notification" is received from the information processing apparatus 100. If it is determined that the "processing cancellation notification" is received, the process proceeds to step S604; otherwise, the server 150 waits to receive the "processing cancellation notification".

In step S604, the server 150 determines whether it is performing processing corresponding to the "processing cancellation notification". If the server 150 is performing such processing, the process proceeds to step S606; otherwise, the process proceeds to steps S608.

In step S606, the server 150 aborts the processing.

In step S608, the server 150 discards the data received from the information processing apparatus 100.

Note that either processing of step S606 or processing of step S608 may be performed first or they may be performed in parallel.

A more detailed description will be given.

In response to occurrence of a waiting job during processing of each plug-in function, the information processing apparatus 100 calculates the "estimated completion time_1" that is expected in the case where the information processing apparatus 100 processes the waiting job (step S302).

The information processing apparatus 100 lefts the waiting job unprocessed and transmits the "external server ID", the "job ID", the "plug-in ID", the "document data", the "job attribute", and the "estimated completion time_1" to all the servers 150 (step S304).

The server 150 receives the "external server ID", the "job ID", the "plug-in ID", the "document data", the "job attribute", and the "estimated completion time_1" from the information processing apparatus 100 (step S502).

(step 11) The server 150 calculates the "estimated completion time_2" expected in the case where the received "document data" is processed by the plug-in function indicated by the received "plug-in ID" (step S504).

(step 12) The server 150 compares the calculated "estimated completion time_2" with the "estimated completion time_1" received from the information processing apparatus 100 (step S506).

If the "estimated completion time_1"≤the "estimated completion time_2" (YES in step S506), the server 150 discards all the data received from the information processing apparatus 100 (step S508).

If the "estimated completion time_1">the "estimated completion time_2" (NO in step S506), the server 150 accepts the "job ID", the "plug-in ID", the "document data", and the "job attribute" and returns a "processing start notification", the "external server ID", the "job ID", and the "estimated completion time_2" to the information processing apparatus 100 (step S510).

(step 13) The server 150 processes the accepted "document data" and "job attribute" using the plug-in function indicated by the "plug-in ID" (step S512) and returns the "external server ID", the "job ID", the "processed document data", and the "processed job attribute" to the information processing apparatus 100 (step S514).

If the server 150 receives the "processing cancellation notification" during the processing (YES in step S602) and there is a job for which the server 150 is notified to cancel (YES in step S604), the server 150 aborts the processing (step S606) and discards all the received data (step S608). The server 150 then starts processing the next job.

The information processing apparatus 100 performs the following processing.

(step 21) The information processing apparatus 100 waits to receive the "processing start notification", the "external server ID", the "job ID", and the "estimated completion time_2 from any one of the servers 150 before it starts processing the waiting job (step S306).

Upon receipt of the "processing start notification", the "external server ID", the "job ID", and the "estimated completion time_2" from any one of the servers 150, the process proceeds to (step 22) (step S312).

If no server 150 that returns the processing result earlier than the information processing apparatus 100 is found before the information processing apparatus 100 starts processing the waiting job (NO in step S306), the information processing apparatus 100 transmits the "processing cancellation notification" to all the servers 150 and starts processing the job (steps S308 and S310).

(step 22) The information processing apparatus calculates "estimated completion time_1'" for the job indicated by the "job ID" (step S312) and compares the "estimated completion time_1'" with the received "estimated completion time_2" (step S314).

That is, the information processing apparatus 100 takes into account a change in the processing status of the information processing apparatus 100 until estimates are returned from the servers 150, and checks the change in this step.

If the "estimated completion time_1'"≤the "estimated completion time_2" (YES in step S314), the information processing apparatus 100 transmits the "external server ID", the "job ID", and the "processing cancellation notification" to the server 150 that has transmitted the "estimated completion time_2" (step S316).

The process then returns to step 21).

If the "estimated completion time_1'">the "estimated completion time_2" (NO in step S314), the information processing apparatus 100 transmits the "job ID" and the "processing cancellation notification" to the servers 150 other than the server 150 indicated by the "external server ID" (step S320).

The information processing apparatus 100 then deletes the waiting job (step S322) and waits for a job processing result transmitted from the server 150 indicated by the "external server ID" (step S324).

(step 23) Upon receipt of the "external server ID", the "job ID", the "processed document data", and the "processed job attribute" from the server that has transmitted the "processing start notification" (YES in step S326), the information processing apparatus 100 updates information concerning jobs managed thereby and starts the next processing of the plug-in function (step S328).

Processing performed by the job processing/job information management module 120 of the information processing apparatus 100 will be described in more detail.

The job processing/job information management module 120 issues a "job ID" to process an input document to generate and manage a job. The generated job is processed by sequentially calling the plug-in functions based on the "plug-in IDs" defined in a flow file.

In response to occurrence of a waiting job in a process of each plug-in function, the job processing/job information management module 120 determines whether to process the job in the information processing apparatus 100 or the server 150. Note that in the case where the information processing apparatus 100 is ready to start processing the job immediately, the information processing apparatus 100 processes the job. In such a case, the information processing apparatus 100 performs processing of (step 32-1) and (step 32-2) alone (described below) after finishing the processing of the job.

(step 31) The job processing/job information management module 120 calculates the "estimated completion time_1" expected in the case where the information processing apparatus 100 processes the waiting job.

The "estimated completion time_1" is calculated, for example, in accordance with equation as follows:

"estimated completion time_1"=estimated processing completion time for the last job managed at "estimated processing completion time" field+ "unit data processing time"×document data size.

Then, the job processing/job information management module 120 sends information necessary for processing the job (the "job ID", the "plug-in ID", the "document data", the "job attribute", and the "estimated completion time_1") to the server processing management module 125 with the job registered as a waiting job.

(step 32) The job processing/job information management module 120 waits to receive the "processing start notification", the "external server ID", the "job ID", and the "estimated completion time_2" from the server processing management module 125 until it starts processing the waiting job. That is, the job processing/job information management module 120 waits to receive the "processing start notification" transmitted from any one of the servers 150 to which the data has been transmitted in (step 31).

Upon receipt of the "processing start notification", the "external server ID", the "job ID", and the "estimated completion time_2" from the server processing management module 125, the process proceeds to (step 33).

If no server 150 that will return the processing result quicker than the information processing apparatus 100 in (step 33) is found before the information processing apparatus 100 starts processing the waiting job, the job processing/job information management module 120 requests the server processing management module 125 to transmit the "processing cancellation notification" to all the servers 150 and starts processing the job.

After completing processing the job, the job processing/job information management module 120 performs the following processing.

(step 32-1) The job processing/job information management module 120 calculates unit data processing time from the start time and the end time of the job and the size of the processed document data and updates the "unit data processing time" managed by the plug-in processing capability management module 115.

(step 32-2) The job processing/job information management module 120 calculates the estimated processing completion time from the updated "unit data processing time" and the size of the document data of each job and updates the "estimated processing completion time" managed by the plug-in processing capability management module 115. For example, the "estimated processing completion time" is calculated and updated in the following manner for each job managed using the "estimated processing completion time".

"estimated processing completion time" for a certain job=estimated processing completion time for the last job being executed or waiting+"unit data processing time"×document data size.

The job processing/job information management module 120 then start processing the next job.

(step 33) The job processing/job information management module 120 extracts the estimated processing completion time corresponding to the "job ID" from the "estimated processing completion time" managed by the plug-in processing capability management module 115, sets the extracted estimated processing completion time as the "estimated completion time_1'", and compares the "estimated completion time_1'" with the received "estimated completion time_2".

If the "estimated completion time_1'"≤the "estimated completion time_2", the job processing/job information management module 120 sends the "external server ID", the "job ID", and a "specific-external-server processing cancellation notification request" to the server processing management module 125. That is, the job processing/job information management module 120 requests the server processing management module 125 to transmit the "processing cancellation notification" to the server 150 that has transmitted the "estimated completion time_2".

The process then returns to (step 31).

If the "estimated completion time_1'">the "estimated completion time_2", the job processing/job information management module 120 sends the "external server ID", the "job ID", and an "all-external-servers processing cancellation notification request" to the server processing management module 125. That is, the job processing/job information management module 120 requests the server processing management module 125 to transmit the "processing cancellation notification" to the servers 150 other than server 150 indicated by the "external server ID".

The job processing/job information management module 120 then deletes the waiting job managed by the information processing apparatus 100 and waits for a job processing result from the server 150 indicated by the "external server ID".

The job processing/job information management module 120 also deletes data corresponding to the "job ID" from the "estimated processing completion time" managed by the plug-in processing capability management module 115 and performs the above-described processing of (step 33-2) for the following job.

(step 34) Upon receipt of the "job ID", the "processed document data", and the "processed job attribute" from the server 150 that has transmitted the "processing start notification", the job processing/job information management module 120 updates information concerning jobs managed by the information processing apparatus 100 and starts processing of the next plug-in function.

Processing performed by the server processing management module 125 of the information processing apparatus 100 will be described in more detail.

The server processing management module 125 manages communications with the servers 150.

In the case of receiving the "job ID", the "plug-in ID", the "document data", the "job attribute", and the "estimated completion_1" from the job processing/job information management module 120, the server processing management module 125 transmits the "main server ID" of the information processing apparatus 100, the "external server ID", the "job ID", the "document data", the "plug-in ID", the "job attribute", and the "estimated completion time_1" to all the servers 150 corresponding to the "external server IDs" extracted from the server information management module 110".

The server processing management module 125 also stores a "transmission list" in which a list of the transmitted "external server IDs", the "job ID", and the "plug-in ID" are associated with one another.

In the case of receiving the "processing start notification", the "external server ID", the "job ID", and the "estimated completion time_2" from the server 150, the server processing management module 125 supplies the "processing start notification", the "external server ID", the "job ID", and the "estimated completion time_2" to the job processing/job information management module 120.

In the case of receiving the "external server ID", the "job ID", and the "specific-external-server processing cancellation notification request" from the job processing/job information management module 120, the server processing management module 125 transmits the "processing cancellation notification" and the "job ID" to the server 150 indicated by the "external server ID".

The server processing management module 125 also deletes the external server ID from the list of "external server IDs" included in the "transmission list".

In the case of receiving the "external server ID", the "job ID", and the "all-external-servers processing cancellation notification request" from the job processing/job information management module 120, the server processing management module 125 transmits the "processing cancellation notification" and the "job ID" to the server 150 indicated by the "external server ID".

The server processing management module 125 also transmits the "processing cancellation notification" and the "job ID" to the servers 150 indicated by the "external server IDs" other than the "external server ID" in the list of "external server IDs" included in the "transmission list".

The server processing management module 125 deletes the "external server IDs" of the servers 150 to which the "processing cancellation notification" is transmitted, from the list of the "external server IDs" included in the "transmission list".

In the case of receiving the "external server ID", the "job ID", the "processed document data", and the "processed job attribute" from the server 150, the server processing management module 125 transmits the "job ID", the "plug-in ID", the "processed document data", and the "processed job attribute" to the job processing/job information management module 120 by referring to the "transmission list" and deletes the "transmission list" associated with the "external server ID" and the "job ID".

Processing performed by the information-processing-apparatus processing management module 165 of the server 150 will be described in more detail.

The information-processing-apparatus processing management module 165 manages communications with the information processing apparatus 100.

In the case of receiving the "main server ID", the "external server ID", the "job ID", the "document data", the "job attribute", the "plug-in ID", and the "estimated completion time_1" that are transmitted from the server processing management module 125 of the information processing apparatus 100, the information-processing-apparatus processing management module 165 sends all of these pieces of information to the job processing/job information management module 160.

In the case of receiving a "processing start notification request", the "external server ID", the "job ID", and the "estimated completion time_2" from the job processing/job information management module 160, the information-processing-apparatus processing management module 165 transmits the "processing start notification", the "external server ID", the "job ID", and the "estimated completion time_2" to the information processing apparatus 100 indicated by the "main server ID".

The information-processing-apparatus processing management module 165 also stores the "main server ID", the "external server ID", and the "job ID" as a "transmission list".

In the case of receiving the "job ID", the "processed document data", and the "processed job attribute" from the job processing/job information management module 160, the information-processing-apparatus processing management module 165 extracts information having the matching "job ID" from data of the "service URL of the server processing management module 125", the "server ID", and the "job ID" that are stored and transmits the "server ID", the "job ID", the "processed document data", and the "processed job attribute" to the "service URL of the server processing management module 125" of the information processing apparatus 100.

In the case of receiving the "processing cancellation notification" and the "job ID" from the server processing management module 125 of the information processing apparatus 100, the information-processing-apparatus processing management module 165 discards the transmission list (including the "main server ID", the "external server ID", and the "job ID") corresponding to the "job ID" and sends the "processing cancellation notification" and the "job ID" to the job processing/job information management module 160.

In the case of receiving the "job ID", the "processed document data", and the "processed job attribute" from the job processing/job information management module 160, the information-processing-apparatus processing management module 165 transmits the "external server ID", the "job ID", the "processed document data", and the "processed job attribute" to the information processing apparatus 100 indicated by the "main server ID" included in the transmission list corresponding to the received "job ID".

Processing performed by the job processing/job information management module 160 of the server 150 will be described in more detail.

In the case of receiving the "main server ID", the "external server ID", the "job ID", the "document data", the "job attribute", the "plug-in ID", and the "estimated completion time_1" from the information-processing-apparatus processing management module 165, the job processing/job information management module 160 determines whether the processing completes earlier in the case where the job is processed using a plug-in function of the server 150.

(step 41) The job processing/job information management module 160 calculates the "estimated completion time_2" that is expected in the case where the received "document data" is processed by using a plug-in function indicated by the received "plug-in ID".

The "estimated completion time_2" is calculated, for example, in accordance with the equation as follows:

"estimated completion time_2"=estimated processing
  completion time for the last job managed in
  "estimated processing completion time" field+
  "unit data processing time"×document data size (step 42) The job processing/job information management module 160 then compares the calculated "estimated completion time_2" with the "estimated completion time_1" received from the information processing apparatus 100.

If the "estimated completion time_1"≤the "estimated completion time_2", the job processing/job information management module 160 discards all the data (the "main server ID", the "external server ID", the "job ID", the "document data", the "job attribute", the "plug-in ID", and the "estimated completion time_1") received from the information processing apparatus 100.

If the "estimated completion time_1">the "estimated completion time_2", the job processing/job information management module 160 accepts the "job ID", the "plug-in ID", the "document data", and the "job attribute" that have been transmitted thereto.

Then, the job processing/job information management module 160 sends the "processing start notification request", the "main server ID", the "external server ID", the "job ID", and the "estimated completion time_2" to the information-processing-apparatus processing management module 165.

(step 43) The accepted "document data" and the "job attribute" are processed using the plug-in function indicated by the "plug-in ID". The job processing/job information management module 160 then sends the "job ID", the "processed document data", and the "processed job attribute" to the information-processing-apparatus processing management module 165.

After processing of the job has been completed, the server 150 also performs aforementioned (step 32-1) and (step 32-2) performed by the information processing apparatus 100.

Then, processing of the next job is started.

In the case of receiving the "processing cancellation notification" and the "job ID" from the information-processing-apparatus processing management module 165, the job processing/job information management module 160 deletes a waiting job corresponding to the "job ID" if there is such a waiting job, or deletes the job after aborting the processing of the job if the job corresponding to the "job ID" is being processed.

The job processing/job information management module 160 also deletes data associated with the "job ID" from the "estimated processing completion time" of the plug-in processing capability management module 115 and performs the aforementioned processing of (step 32-2) for the following job.

Then, processing of the next job is started.

FIG. 7 is a sequence chart illustrating an example of a process according to the exemplary embodiment. Specifically, FIG. 7 illustrates an example of a process performed in the case of requesting the server 150B to perform processing.

Suppose that a waiting job occurs in processing performed by a plug-in A in the information processing apparatus 100 in step S700.

In step S702, the information processing apparatus 100 calculates the "estimated completion time_1".

In step S704, the information processing apparatus 100 transmits the "job ID", the "plug-in ID", the "document data", the "job attribute", and the "estimated completion time_1" to the servers 150A to 150E.

In step S706A, the server 150A calculates the "estimated completion time_2".

In step S708A, the server 150A accepts the job if the "estimated completion time_1">the "estimated completion time_2".

In step S710A, the server 150A transmits the "estimated completion time_2" to the information processing apparatus 100.

In step S720, the information processing apparatus 100 requests only a specific server 150 to cancel the processing if the "estimated completion time_1'"<the "estimated completion time_2".

In step S722, the information processing apparatus 100 requests the server 150A to cancel the processing.

In step S724A, the server 150A deletes the job.

In step S706B, the server 150B calculates the "estimated completion time_2".

In step S708B, the server 150B accepts the job if the "estimated completion time_1">the "estimated completion time_2".

In step S710B, the server 150B transmits the "estimated completion time_2" to the information processing apparatus 100.

In step S726, the information processing apparatus 100 deletes the (waiting) job if the "estimated completion time_1'">the "estimated completion time_2", requests all the other servers 150 to cancel the processing, and waits for a processing result obtained by the server 150B.

In step S706E, the server 150E calculates the "estimated completion time_2".

In step S708E, the server 150E deletes the job transmitted thereto if the "estimated completion time_1"<the "estimated completion time_2".

In step S728, the information processing apparatus 100 requests the servers 150C to 150E to cancel the processing.

In step S730C, the server 150C deletes the job.

In step S730D, the server 150D deletes the job.

In step S730E, the server 150E deletes the job.

In step S712B, the server 150B processes the job transmitted thereto using the plug-in.

In step S714B, the server 150B transmits the "job ID", the "processed document data", and the "processed job attribute" to the information processing apparatus 100.

In step S732, the information processing apparatus 100 updates the job information, and the next plug-in processing is performed.

The "estimated completion time_2" 752A for the server A is earlier than the "estimated completion time_1" 750 for the information processing apparatus 100 but is later than the "estimated completion time_1'" 754 for the information processing apparatus 100. Accordingly, the server 150A accepts the job (start the job) but the job is cancelled.

The "estimated completion time_2" 752B for the server B is earlier than the "estimated completion time_1" 750 for the information processing apparatus 100 and the "estimated completion time_1''" 756 for the information processing apparatus 100. Accordingly, the server 150B accepts the job and performs processing, and the information processing apparatus 100 deletes the waiting job.

FIGS. 8A to 8C illustrate an example of a process according to the exemplary embodiment. FIGS. 8A to 8C describe that a queue of jobs changes from moment to moment in the information processing apparatus 100 and the estimated completion time changes in response to such a change.

The example in FIG. 8A indicates that a waiting job 5 occurs at time t1 (for example, in step S700) in a state where a job 1 is being performed and there are waiting jobs 2, 3, and 4. The information processing apparatus 100 calculates the "estimated completion time_1" for the waiting job 5 and transmits the "estimated completion time_1" to the servers 150.

At time t2 (for example, in step S726: when the "estimated completion time_2" is received from the server 150B) illustrated in the example in FIG. 8B, processing of the job 1 has ended (or deleted) and processing of the job 2 has been started. The jobs 3, 4, and 5 are kept waiting. At this time point, the information processing apparatus 100 calculates the "estimated completion time_1'" (this is the second time that the information processing apparatus 100 calculates the estimated completion time) for the waiting job 5 and compares the "estimated completion time_1'" with the "estimated completion time_2" received from the server 150B.

At time t3 (for example, when the "estimated completion time_2" is received from the server 150C) illustrated in the example in FIG. 8C, the job 2 is still being processed but processing of the waiting job 3 has been transferred to a server 150X and the waiting job 3 has been deleted. Accordingly, the waiting jobs are the jobs 4 and 5. At this time point, the information processing apparatus calculates the "estimated completion time_1''" (this is the third time that the information processing apparatus 100 calculates the estimated completion time) for the waiting job 5 and compares the "estimated completion time_1''" with the "estimated completion time_2" received from the server 150C.

Note that the job queue changes from moment to moment in the information processing apparatus 100 because of not only the processing status of the information processing apparatus 100 but also the processing status of the servers 150 as illustrated in the example in FIG. 8C.

FIG. 9 is a sequence chart illustrating an example of a process according to the exemplary embodiment.

Suppose that a waiting job occurs in processing performed by the plug-in A in the information processing apparatus in step S900.

In step S902, the information processing apparatus 100 calculates the "estimated completion time_1".

In step S904, the information processing apparatus 100 transmits the "job ID", the "plug-in ID", the "document data", the "job attribute", and the "estimated completion time_1" to the servers 150A to 150E.

In step S906A, the server 150A calculates the "estimated completion time_2".

In step S908A, the server 150A accepts the job if the "estimated completion time_1">the "estimated completion time_2".

In step S910A, the server 150A transmits the "estimated completion time_2" to the information processing apparatus 100.

In step S920, the information processing apparatus 100 requests the specific server 150 to cancel the processing if the "estimated completion time_1'"<the "estimated completion time_2".

In step S922, the information processing apparatus 100 requests the server 150A to cancel the processing.

In step S924A, the server 150A deletes the job.

In step S906B, the server 150B calculates the "estimated completion time_2".

In step S908B, the server 150B accepts the job if the "estimated completion time_1">the "estimated completion time_2".

In step S910B, the server 150B transmits the "estimated completion time_2" to the information processing apparatus 100. It is assumed that the information processing apparatus 100 is ready to process a waiting job as in step S926 when the "estimated completion time_2" is received from the server 150B.

In step S906E, the server 150E calculates the "estimated completion time_2".

In step S908E, the server 150E deletes the job transmitted thereto if the "estimated completion time_1"<the "estimated completion time_2".

In step S926, if the information processing apparatus 100 is ready to process a waiting job, the information processing apparatus 100 starts processing the job and requests all the servers 150 to cancel the processing.

In step S928, the information processing apparatus 100 requests the servers 150B to 150E to cancel the processing. Since the information processing apparatus 100 has requested the server 150A to cancel the processing in step S922, the information processing apparatus 100 need not transmit the request to the server 150A again but may transmit the request to the server 150A again.

In step S930B, the server 150B deletes the job.

In step S930C, the server 150C deletes the job.

In step S930D, the server 150D deletes the job.

In step S930E, the server 150E deletes the job.

In step S932, the information processing apparatus 100 finishes processing the job and updates the job information. Then, the next plug-in processing is performed.

The "estimated completion time_2" 952 for the server A is earlier than the "estimated completion time_1" 950 for the information processing apparatus 100 but is later than the "estimated completion time_1'" for the information processing apparatus 100. Accordingly, the server 150A accepts the job (starts the job) but the job is cancelled.

In the exemplary embodiment described above, document data is transmitted to all the servers 150 in response to occurrence of a waiting job in processing performed by a plug-in, imposing a load on the communication network.

Accordingly, a function that determines whether or not to perform processing of a waiting job before determining the server 150 that processes the job (a determination process A) when such a waiting job occurs. The determination process A may include the overall processing performed by the information processing apparatus 100. That is, the determination described below may be performed immediately after occurrence of a waiting job.

The function for determining may make the determination by using the followings, for example.

(1) Making Determination Using Size of Document Data

The size of target document data (document data included in a job) is extracted. If the size of the document data is less than or is less than or equal to a predetermined threshold, the determination process A is performed.

(2) Making Determination Using Estimated Completion Time

The estimated completion time is calculated for the waiting job by using "size of document data× unit data processing time". If the resulting value is greater than or is greater than or equal to predetermined time, the determination process A is performed.

Examples of the predetermined time include values as follows:
  value (threshold) specified by the user, and
  average processing time of the case where the job is processed by the servers 150. The average processing time will be described later.

In addition, to decrease the size of transmitted data, only data used by the plug-in function may be extracted and the extracted data may be transmitted as the document data. For example, in the case where the plug-in function implements character recognition processing on an area, data of the area subjected to the character recognition processing may be extracted and the extracted data may be transmitted as the document data.

In the case where the server processing management module 125 of the information processing apparatus 100 receives the processing result of the job (the "external server ID", the "job ID", the "processed document data", and the "processed job attribute") before receiving the "processing start notification" from the server 150, the server processing management module 125 may send only the processing result of the job that is returned first, to the job processing/job information management module 120.

Then, the server processing management module 125 transmits the "processing cancellation notification" and the "job ID" to the servers 150 assigned the "server IDs" other than the received "external server ID" by referring to the stored "transmission list" and deletes the stored "transmission list".

The server processing management module 125 discards all the job processing results received thereafter. For example, in the case where a processing result including the "external server ID" and the "job ID" for which the transmission list is absent is received, such data may be discarded.

More detailed processing content will be described next.

The flow file registration module 130 of the information processing apparatus 100 creates and registers a flow file for processing an input document. The flow file is defined by specifying plural plug-ins.

The flow file management module 135 manages flow files registered by the flow file registration module 130, by using a list of flow IDs and a list of plug-in IDs. In the list of plug-in IDs, plug-in IDs are managed in processing order. For example, a plug-in ID list 1000 is used. FIG. 10 illustrates an example of a data structure of the plug-in ID list 1000. The plug-in ID list 1000 includes a flow ID field 1005, a plug-in ID field for a plug-in function to be processed first (hereinafter, referred to as a first plug-in ID field) 1010, a plug-in ID field for a plug-in function to be processed second (hereinafter, referred to as a second plug-in ID field) 1020, and a plug-in ID field for a plug-in function to be processed third (hereinafter, referred to as a third plug-in ID field) 1030. The flow ID field 1005 stores information (flow ID) for uniquely identifying a flow file in the exemplary embodiment. The first plug-in ID field 1010 stores a plug-in ID of a plug-in function to be processed first. The second plug-in ID field 1020 stores a plug-in ID of a plug-in function to be processed second. The third plug-in ID field 1030 stores a plug-in ID of a plug-in function to be processed third. An n-th plug-in ID field 10N0 stores a plug-in ID of a plug-in function to be processed the n-th turn.

The server information registration module 105 registers information concerning the servers 150. The information concerning the servers 150 may be information input by a user operation or information transmitted from the corresponding servers 150.

The server information management module 110 manages ID information (for example, service URL) with which each of the servers 150 is uniquely identified and a service provided by each of the servers 150 is accessed.

The plug-in processing capability management module 115 manages, for each plug-in function, information in a form of a plug-in processing capability management table 1100. FIG. 11 illustrates an example of a data structure of the plug-in processing capability management table 1100.

The plug-in processing capability management table 1100 includes a plug-in ID field 1105, an estimated processing completion time field 1110, a field for a unit data processing time of the main server (sec/KB) (hereinafter, referred to as a main-server processing time field) 1120, and a field for unit data processing time of the external server (Sec/KB) (hereinafter, referred to as an external-server processing time field) 1130. The plug-in ID field 1105 stores information (plug-in ID) for uniquely identifying a plug-in in the exemplary embodiment. The estimated processing completion time field 1110 stores the estimated processing completion time. The main-server processing time field 1120 stores time taken by the information processing apparatus 100 to process unit data (Sec/KB). The external-server processing time field 1130 stores time taken by the server 150 to process unit data (Sec/KB). Note that, in the estimated processing completion time field 1100, estimated completion time for each of the job currently being processed and jobs for which processing is reserved in the information processing apparatus 100 is managed.

The job processing/job information management module 120 generates and manages a job for processing an input document. A job is managed by associating an ID uniquely indicating the job, a plug-in ID of a plug-in function with which the job is processed last, document data (binary data), a list of attributes and attribute values with one another as in a job management table 1200. FIG. 12 illustrates an example of a data structure of the job management table 1200. The job management table 1200 includes a job ID field 1205, a processed plug-in ID field 1210, a document data field 1220, a document data size field 1230, and a job attribute field 1240. The job ID field 1205 stores information (job ID) for uniquely identifying a job. The processed plug-in ID field 1210 stores a plug-in ID of a plug-in with which processing has been done. The document data field 1220 stores document data. The document data size field 1230 stores the size of the document data. The job attribute field 1240 stores a job attribute.

The job processing/job information management module 120 processes the generated job by sequentially calling the plug-in functions defined by the flow file.

Processing performed from when a document is input to when processing of a job completes is as described later in relation to a "process flow D".

The job processing/job information management module 120 determines whether to perform processing by the information processing apparatus 100 or by the server 150 when a plug-in function is executed in (step D3) of the "process flow D".

If the information processing apparatus 100 is ready to start the processing immediately, the job processing/job information management module 120 determines that the processing is to be performed by the information processing apparatus 100.

If the information processing apparatus 100 is not ready to start the processing immediately (if the job is kept waiting), the job processing/job information management module 120 performs a determination in accordance with a "process flow A" (described below).

If it is determined that the processing is to be performed by the information processing apparatus 100, the job processing/job information management module 120 performs processing in accordance with a "process flow B" (described below).

If it is determined that the processing is to be performed by the server 150, the job processing/job information management module 120 calculates the "estimated completion time_1" using equation as follows:

"estimated completion time_1"=current time+document data size×unit data processing time of the main server.

The job processing/job information management module 120 then supplies the "job ID", the "plug-in ID", the "document data", the "job attribute", and the "estimated completion time_1" to the server processing management module 125.

In the case of receiving the processing result (the "job ID", the "plug-in ID", the "processed document data", the "processed job attribute", and the "processing time") obtained by the server 150 from the server processing management module 125, the job processing/job information management module 120 updates the "processed plug-in ID", the "document data", the "document data size", and the "job attribute" of the job managed by the information processing apparatus 100 by using the "job ID" as a search key.

The job processing/job information management module 120 also calculates the unit data processing time of the server 150 by using the equation as follows:

"unit data processing time of the server 150"="processing time"/"data size of processed document data".

The job processing/job information management module 120 updates the "average unit data processing time of server 150" associated with the plug-in ID in the plug-in processing capability management module 115.

The server processing management module 125 manages communications with the servers 150.

In the case of receiving the "job ID", the "plug-in ID", the "document data", the "job attribute", and the "estimated completion time_1" from the job processing/job information management module 120, the server processing management module 125 transmits the "service URL of the server processing management module 125" of the information processing apparatus 100, the "server ID", the "job ID", the "document data", the "plug-in ID", the "job attribute", and the "estimated completion time_1" to the servers 150 indicated by all the "server IDs" extracted from the server information management module 110.

The server processing management module 125 then stores a list of the "job ID" and the "plug-in ID" that have been transmitted (and the "server ID" and the "transmission date/time").

In the case of receiving the "processing start notification" and the "server ID" from the server 150, the server processing management module 125 performs the following processing in accordance with the stored list of the "job ID" and the "plug-in ID" (and the "server ID" and the "transmission date/time").

1) The server processing management module 125 stores (the "server ID", the "transmission time"), the "plug-in ID", and the "job ID" for the server 150 that has transmitted the "processing start notification".

2) The server processing management module 125 also transmits the "processing cancellation notification" and the "job ID" to the servers 150 assigned the "server IDs" other than the "server ID" stored in 1).

In the case of receiving the "server ID", the "job ID", the "processed document data", and the "processed job attribute" from that server 150 that has transmitted the "processing start notification", the server processing management module 125 calculates the "processing time" from (the "server ID" and the "transmission time"), the "plug-in ID", and the "job ID" that are stored and the reception time by using equation of "processing time"="reception time"–"transmission time". The server processing management module 125 supplies the processing result (the "job ID", the "plug-in ID", the "processed document data", the "processed job attribute", and the "processing time") to the job processing/job information management module 120.

In the case where the job processing result (the "server ID", the "job ID", the "processed document data", and the "processed job attribute") is returned before the "processing start notification" is received from the server 150, the server processing management module 125 sends only the job processing result that is returned first to the job processing/job information management module 120.

The server processing management module 125 transmits the "processing cancellation notification" and the "job ID" to the servers 150 indicated by the "server IDs" other than the received "server ID" and deletes (the "server ID" and the "transmission time"), the "plug-in ID", and the "job ID" that are managed for the servers 150.

The server processing management module 125 discards all the job processing results received thereafter. For example, the server processing management module 125 may discard the processing result of the job for which the "server ID", the "plug-in ID", and the "job ID" are not stored.

The plug-in processing capability management module 155 of the server 150 manages, for each plug-in function, a plug-in processing capability management table 1300. FIG. 13 illustrates an example of a data structure of the plug-in processing capability management table 1300. The plug-in processing capability management table 1300 includes a plug-in ID field 1305, an estimated processing completion time field 1310, and a unit data processing time (Sec/KB) field 1320. The plug-in ID field 1305 stores a plug-in ID. The estimated processing completion time field 1310 stores the estimated processing completion time. The unit data processing time (Sec/KB) field 1320 stores time taken to process unit data (Sec/KB). Note that, in the estimated processing completion time field 1310, estimated completion times of processing of a job currently being processed by the server 150 and jobs for which processing is reserved are managed.

The information-processing-apparatus processing management module 165 manages communications with the information processing apparatus 100.

Specifically, in the case of receiving the "service URL of the server processing management module 125", the "server ID", the "job ID", the "document data", the "job attribute", the "plug-in ID", and the "estimated completion time_1" from the server processing management module 125 of the information processing apparatus 100, the information-processing-apparatus processing management module 165 sends all the pieces of information to the job processing/job information management module 160.

In the case of receiving the "the service URL of the server processing management module 125", the "server ID", and the "job ID" from the job processing/job information management module 160, the information-processing-apparatus processing management module 165 transmits the "processing start notification" and the "server ID" to the "service URL of the server processing management module 125" of the information processing apparatus 100 and stores the "service URL of the server processing management module 125", the "server ID", and the "job ID".

In the case of receiving the "job ID", the "processed document data", and the "processed job attribute" from the job processing/job information management module 160, the information-processing-apparatus processing management module 165 extracts information associated with the "job ID" identical to the received "job ID" from the stored data including the "service URL of the server processing management module 125", the "server ID", and the "job ID" and transmits the "server ID", the "job ID", the "processed document data", and the "processed job attribute" to the "service URL of the server processing management module 125" of the information processing apparatus 100.

In the case of receiving the "processing cancellation notification" and the "job ID" from the server processing management module 125 of the information processing apparatus 100, the information-processing-apparatus processing management module 165 sends the "processing cancellation notification" and the "job ID" to the job processing/job information management module 160.

In the case of receiving the "service URL of the server processing management module 125", the "server ID", the "job ID", the "document data", the "job attribute", the "plug-in ID", and the "estimated completion time_1" from the information-processing-apparatus processing management module 165, the job processing/job information management module 160 obtains the "estimated processing completion time" and the "unit data processing time" from the plug-in processing capability management module 155 and calculates the "estimated completion time_2" by using the equation as follows:

"estimated completion time_2"="estimated processing completion time"+"unit data processing time of the server 150"×document data size.

The job processing/job information management module 160 then compares the "estimated completion time_1" with the "estimated completion time_2".

The job processing/job information management module 160 determines that processing is to be performed by the information processing apparatus 100 if the "estimated completion time_1"≤"estimated completion time_2".

The job processing/job information management module 160 determines that processing is to be performed by the server 150 if the "estimated completion time_1">"estimated completion time_2".

If it is determined that the processing is to be performed by the information processing apparatus 100, the job processing/job information management module 160 deletes the "service URL of the server processing management module 125", the "server ID", the "job ID", the "plug-in ID", the "document data", the "job log", and the "estimated completion time_1" that have been obtained.

If it is determined that the processing is to be performed by the server 150, the job processing/job information management module 160 returns the "service URL of the server processing management module 125", the "server ID", the "job ID" to the information-processing-apparatus processing management module 165. The job processing/job information management module 160 also calls the plug-in function corresponding to the "plug-in ID" to perform processing in accordance with a "process flow C".

In the case of receiving the "processing cancellation notification" and the "job ID" from the information-processing-apparatus processing management module 165, the job processing/job information management module 160 deletes a waiting job corresponding to the "job ID" if there is such a waiting job or deletes the job after aborting the processing if the job is being processed.

Process Flow A

The process flow A is a process flow in which the job processing/job information management module 120 of the information processing apparatus 100 determines whether processing is to be performed by the information processing apparatus 100 or by the server 150.

(step A1) The job processing/job information management module 120 obtains information concerning the corresponding plug-in function (the "plug-in ID", the "estimated processing completion time", the "unit data processing time of the information processing apparatus 100", and a "threshold for determining whether to transfer the processing to the server 150") from the plug-in processing capability management module 115.

(step A2) The job processing/job information management module 120 calculates the "estimated completion time_1" that is expected in the case where processing is performed by the information processing apparatus 100, by using the equation as follows:

estimated completion time_1=(estimated processing completion time−current time)+document data size×unit data processing time of the main server.

(step A3) The job processing/job information management module 120 calculates the "estimated completion time_2" that is expected in the case where processing is performed by the server 150, by using the equation as follows:

estimated completion time_2=document data size× unit data processing time of the external server.

The calculated "estimated completion time" is compared with the obtained threshold.

(step A4) The job processing/job information management module 120 then compares the "estimated completion time_1" with the "estimated completion time_2".

The job processing/job information management module 120 determines that processing is to be performed by the server 150 if the "estimated completion time_1">the "estimated completion time_2".

The job processing/job information management module 120 determines that processing is to be performed by the information processing apparatus 100 if the "estimated completion time_1"≤the "estimated completion time_2".

Process Flow B

The process flow B is a flow of the case where the job processing/job information management module 120 of the information processing apparatus 100 performs processing of a job.

(step B1) The job processing/job information management module 120 obtains the "unit data processing time of the main server" and a list of "estimated processing completion time" from the plug-in processing capability management module 115.

The job processing/job information management module 120 calculates the "estimated processing completion time" for each job in accordance with "estimated processing completion time"=current time+"unit data processing time of the main server"× document data size of the job.

The job processing/job information management module 120 then updates the list of "estimated processing completion time" in the plug-in processing capability management module 115.

(step B2) The job processing/job information management module 120 starts processing the job.

After completing the processing of the job, the job processing/job information management module 120 calculates the "unit data processing time"=job processing time/document data size, and updates the "unit data processing time of the main server" stored in the plug-in processing capability management module 115 by using a value derived by using the following equation, for example.

"unit data processing time of the main server"=
("unit data processing time of the main
server"+"unit data processing time")/2

(step B4) The job processing/job information management module 120 performs the same processing as that in (step B1) and updates the list of "estimated processing completion time" in the plug-in processing capability management module 115.

Process Flow C

The process flow C is a flow of the case where processing is performed using a specific plug-in function in the server 150.

(step C1) The job processing/job information management module 160 obtains the "unit data processing time" and the list of "estimated processing completion time" from the plug-in processing capability management module 155 and calculates, for each job, the "estimated processing completion time"=current time+the "unit data processing time"× data size of the "document data" of the job. The job processing/job information management module 160 then updates the list of "estimated processing completion time" in the plug-in processing capability management module 155.

(step C2) The job processing/job information management module 160 starts processing the job.

(step C3) After completing the processing of the job, the job processing/job information management module 160 sends the "job ID", the "processed document data", and the "processed job attribute" to the information-processing-apparatus processing management module 165.

Then, the job processing/job information management module 160 calculates the "unit data processing time"=the job processing time/data size of the "document data" and updates the "unit data processing time" in the plug-in processing capability management module 155 by using a value derived using the following equation, for example.

"unit data processing time"=("unit data processing
time" stored in the plug-in processing capability
management module 155+the calculated "unit
data processing time")/2

(step C4) The job processing/job information management module 160 performs the same processing as that in (step C1) and updates the list of "estimated processing completion time" in the plug-in processing capability management module 155.

Process Flow D

The process flow D is a flow of the case where an input document is managed and processed as a job by the information processing apparatus 100.

(step D1) In response to input of a document, the information processing apparatus 100 stores the input document at the document data field 1220 and data size of the document at the document data size field 1230 of the job management table 1200. The information processing apparatus 100 also issues ID information and stores the ID information at the job ID field 1205. If the input document has attribute information or the like, the information processing apparatus 100 registers the attribution information at the job attribute field 1240 at that time.

(step D2) The information processing apparatus 100 extracts flow data used to process the input document from the flow file management module 135 and extracts the plug-in ID of the plug-in function to be used first.

Which flow data is to be used to process the input document may be determined based on the way in which the document is input, for example. Specifically, as many flow files as the number of processes corresponding to the ways of inputting a document may be prepared, for example, such that a "flow 001" is used in the case of "input via a folder A", a "flow 002" is used in the case of "input via a shared folder B", a "flow 0009" is used in the case of "input by file transfer protocol (FTP)-based transfer", a "flow 003" is used in the case of "fax processing", a "flow 004" is used in the case of "input via a confidential folder", and a "flow 0006" is used in the case of "mail-based processing".

Thereafter, processing of (step D3) and (step D4) are performed as many times as the number of plug-in functions defined by the flow data.

(step D3) The information processing apparatus 100 calls the plug-in function corresponding to the plug-in ID to perform processing for the document data field 1220 and the job attribute field 1240 of the job management table 1200.

At that time, one of the information processing apparatus 100 and the servers 150 performs processing using the plug-in in accordance with the exemplary embodiment.

(step D4) The information processing apparatus 100 updates the document data field 1220, the document data size field 1230, and the job attribute field 1240 of the job management table 1200 by using the document data and the job attribute obtained from the processing in (step D3).

The information processing apparatus 100 then updates the processed plug-in ID field 1210 of the job management table 1200 to the plug-in ID of the plug-in with which the processing has completed.

Referring to FIG. 14, an example of a hardware configuration of the information processing apparatus 100 according to the exemplary embodiment will be described. The configuration illustrated in FIG. 14 is implemented by, for example, a personal computer (PC) and is an exemplary hardware configuration including a data scanning unit 1417, such as a scanner, and a data output unit 1418, such as a printer.

A CPU 1401 is a controller that executes a process in accordance with a computer program which describes execution sequences of the various modules described in the exemplary embodiment above, that is, various modules such as the server information registration module 105, the server information management module 110, the plug-in processing capability management module 115, the job processing/job information management module 120, the server processing management module 125, the plug-in processing capability management module 155, the job processing/job information management module 160, and the information-processing-apparatus processing management module 165.

A read-only memory (ROM) 1402 stores a program and operation parameters used by the CPU 1401, for example. A RAM 1403 stores a program being executed by the CPU 1401 and parameters that change accordingly during the execution, for example. The CPU 1401, the ROM 1402, and the RAM 1403 are connected to one another via a host bus 1404, such as a CPU bus.

The host bus 1404 is connected to an external bus 1406, such as a peripheral component interconnect/interface (PIC) bus, via a bridge 1405.

A keyboard 1408 and a pointing device 1409, such as a mouse, are input devices operated by an operator. A display 1410, such as a liquid crystal display or a cathode ray tube (CRT) display, displays various kinds of information using text or an image.

An HDD 1411 includes a hard disk and drives the hard disk to record or reproduce a program executed by the CPU 1401 or information. The hard disk stores, for example, processing-target document data, the plug-in ID list 1000, the plug-in processing capability management table 1100, the job management table 1200, and the plug-in processing capability management table 1300. The hard disk further stores other information, such as various kinds of data and various computer programs.

A drive 1412 reads data or a program stored on a removable recording medium 1413 mounted thereto, such as a magnetic disk, an optical disc, a magneto-optical disk, or a semiconductor memory; and provides the data or program to the RAM 1403 connected thereto via an interface 1407, the external bus 1406, the bridge 1405, and the host bus 1404. The removable recording medium 1413 may also be used as a data storage area just like the hard disk.

A connection port 1414 is a port to which an externally connected device 1415 is to be connected and has a port based on Universal Serial Bus (USB) or Institute of Electrical and Electronics Engineers (IEEE) 1394. The connection port 1414 is connected to the CPU 1401 via the interface 1407, the external bus 1406, the bridge 1405, and the host bus 1404. A communication unit 1416 is connected to a communication network and performs a process to communicate with an external apparatus. The data scanning unit 1417, for example, a scanner, performs a document scanning process. The data output unit 1418, for example, a printer, performs a document data output process.

The hardware configuration of the information processing apparatus 100 illustrated in FIG. 14 merely illustrates a configuration example, and the hardware configuration used in the exemplary embodiment is not limited to the configuration illustrated in FIG. 14. The hardware configuration may be any configuration that enables execution of the modules described in the exemplary embodiment. For example, some of the modules may be implemented by dedicated hardware (e.g., an application specific integrated circuit (ASIC)), or may reside on an external system and may be connected to the information processing apparatus 100 via the communication network. Further, plural systems illustrated in FIG. 14 may be connected to one another via the communication network and operate in cooperation with one another. The configuration may be incorporated into a mobile information communication device (such as a mobile phone, a smartphone, a mobile terminal, or a wearable computer), a smart home appliance, a robot, a copier, a fax, a scanner, a printer, or a multifunction peripheral as well as the PC.

Regarding comparison with a predetermined value in the description of the above-described exemplary embodiment, "greater than or equal to", "less than or equal to", "greater than", and "less than" may be replaced with "greater than", "less than", "greater than or equal to", and "less than or equal to", respectively, as long as contradiction does not occur in the combination thereof. The same applies to "earlier" and "later".

The described program may be provided after being stored on a recording medium or may be provided via a communication network. In such a case, for example, the described program may be regarded as the invention related to a "computer readable recording medium storing a program".

The "computer readable recording medium storing a program" is a computer readable recording medium storing a program that is used for installing and executing the program, for distribution of the program, and so forth.

Examples of the recording medium include Digital Versatile Discs (DVDs), such as "DVD-R, DVD-RW, and DVD-RAM" based on standards decided by DVD Forum and "DVD+R and DVD+RW" based on standards decided by DVD+RW; Compact Discs (CDs), such as CD-ROM, CD-recordable (CD-R), and CD-rewritable (CD-RW); Blu-ray Discs (registered trademark); magneto-optical disks (MOs); flexible disks (FDs); magnetic tapes; hard disks; ROMs; electrically erasable programmable ROMs (EEPROMs (registered trademark)); flash memories; RAMs; and secure digital (SD) memory cards.

The program or part of the program may be recorded on the recording media for storage or distribution. Also, the program or part of the program may be transmitted by communication using a transmission medium, for example, a wired network, a wireless communication network, or a combination thereof that is used in a local area network (LAN), a metropolitan area network (MAN), a wide area network (WAN), the Internet, an intranet, or an extranet; or may be propagated over carrier waves.

Moreover, the program may be part of another program or may be recorded on a recording medium together with other individual programs. Alternatively, the program may be divided and portions of the program may be recorded on plural recording media. The program may be recorded in any restorable form, such as a compressed or encrypted form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A job processing system comprising:
a first job processing apparatus; and
a second job processing apparatus connected to the first job processing apparatus via a communication line,
the first job processing apparatus including
a first calculation unit that calculates, in a case where a job to be processed occurs in the first job processing apparatus, first estimated completion time for a case where the job is processed by the first job processing apparatus, and
a first transmission unit that transmits at least the job and the first estimated completion time to the second job processing apparatus, and
the second job processing apparatus including
a reception unit that receives the job and the first estimated completion time from the first job processing apparatus, a second calculation unit that calculates second estimated completion time for a case where the received job is processed by the second job processing apparatus, a discarding unit that discards the received job in a case where the first estimated completion time is earlier than the second estimated completion time, a notification unit that starts processing the received job in a case where the first estimated completion time is later than the second estimated completion time and that notifies the first job processing apparatus that processing of the received job has been started, and a processed job transmission unit that transmits the processed job to the first job processing apparatus in response to completion of the processing of the received job.

2. The job processing system according to claim 1, wherein the notification unit of the second job processing apparatus further notifies the first job processing apparatus of the second estimated completion time in a case where the notification unit starts processing the received job, and the first job processing apparatus further includes a comparing unit that calculates a third estimated completion time for a case where the job is processed by the first job processing apparatus and that compares the second estimated completion time with the third estimated completion time.

3. The job processing system according to claim 2, wherein the first job processing apparatus further includes a second transmission unit that transmits a request to cancel the processing of the received job to the second job processing apparatus in a case where the third estimated completion time is earlier than the second estimated completion time.

4. The job processing system according to claim 1, wherein a size of document data included in the job is extracted in a case where the job to be processed occurs in the first job processing apparatus, and the first calculation unit calculates the first estimated completion time in a case where the size of the document data is less than a predetermined value or is less than or equal to the predetermined value.

5. A job processing apparatus comprising:

a calculation unit that calculates, in a case where a job to be processed occurs in the job processing apparatus, first estimated completion time for a case where the job is processed by the job processing apparatus;

a first transmission unit that transmits at least the job and the first estimated completion time to another job processing apparatus;

a reception unit that receives, from the other job processing apparatus, second estimated completion time for a case where processing of the job is started by the other job processing apparatus;

a comparing unit that calculates third estimated completion time for a case where the job is processed by the job processing apparatus and that compares the third estimated completion time with the second estimated completion time; and a second transmission unit that transmits a request to cancel the processing of the job to the other job processing apparatus in a case where the third estimated completion time is earlier than the second estimated completion time.

6. A job processing apparatus comprising:

a reception unit that receives a job and first estimated completion time from another job processing apparatus;

a calculation unit that calculates second estimated completion time for a case where the received job is processed by the job processing apparatus;

a discarding unit that discards the received job in a case where the first estimated completion time is earlier than the second estimated completion time;

a notification unit that starts processing the received job in a case where the first estimated completion time is later than the second estimated completion time and that notifies the other job processing apparatus that processing of the received job has been started; and a processed job transmission unit that transmits the processed job to the other job processing apparatus in response to completion of the processing of the received job.

7. The job processing apparatus according to claim 6, wherein the notification unit further notifies the other job processing apparatus of the second estimated completion time in a case where the notification unit starts processing the received job.

8. A non-transitory computer readable medium storing a program causing a computer to execute a process for processing a job, the process comprising:

calculating, in a case where a job to be processed occurs in a job processing apparatus that is the computer, first estimated completion time for a case where the job is processed by the job processing apparatus;

transmitting at least the job and the first estimated completion time to another job processing apparatus;

receiving, from the other job processing apparatus, second estimated completion time for a case where processing of the job is started by the other job processing apparatus;

calculating third estimated completion time for a case where the job is processed by the job processing apparatus and comparing the third estimated completion time with the second estimated completion time; and transmitting a request to cancel the processing of the job to the other job processing apparatus in a case where the third estimated completion time is earlier than the second estimated completion time.

9. A non-transitory computer readable medium storing a program causing a computer to execute a process for processing a job, the process comprising:

receiving a job and first estimated completion time from another job processing apparatus;

calculating second estimated completion time for a case where the received job is processed by a job processing apparatus that is the computer;

discarding the received job in a case where the first estimated completion time is earlier than the second estimated completion time;

starting processing the received job in a case where the first estimated completion time is later than the second estimated completion time and notifying the other job processing apparatus that processing of the received job has been started; and transmitting the processed job to the other job processing apparatus in response to completion of the processing of the received job.

* * * * *